United States Patent
Ninomiya

(10) Patent No.: US 10,001,921 B2
(45) Date of Patent: Jun. 19, 2018

(54) DATA MIGRATION METHOD AND DATA MIGRATION DEVICE

(71) Applicant: FUJITSU LIMITED, Kawasaki-shi, Kanagawa (JP)

(72) Inventor: Atsushi Ninomiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 14/795,917

(22) Filed: Jul. 10, 2015

(65) Prior Publication Data
US 2016/0034197 A1 Feb. 4, 2016

(30) Foreign Application Priority Data
Aug. 4, 2014 (JP) .................................. 2014-158381

(51) Int. Cl.
*G06F 12/00* (2006.01)
*G06F 3/06* (2006.01)
(Continued)

(52) U.S. Cl.
CPC .......... *G06F 3/0604* (2013.01); *G06F 3/0647* (2013.01); *G06F 3/0683* (2013.01);
(Continued)

(58) Field of Classification Search
CPC ............... G06F 3/0604; G06F 12/0868; G06F 12/0893; G06F 3/0647; G06F 3/0683;
(Continued)

(56) References Cited

U.S. PATENT DOCUMENTS 5,185,861 A * 2/1993 Valencia ............... G06F 9/5033
710/52
7,100,089 B1 * 8/2006 Phelps .................. G06F 3/0607
711/162
(Continued)

FOREIGN PATENT DOCUMENTS

JP 02-035529 2/1990
JP 04-180143 6/1992
(Continued)

OTHER PUBLICATIONS

Elmore, Aaron J., et al. "Zephyr: live migration in shared nothing databases for elastic cloud platforms." Proceedings of the 2011 ACM SIGMOD International Conference on Management of data. ACM, 2011.*

*Primary Examiner* — Matthew Bradley
*Assistant Examiner* — Francisco A Grullon
(74) *Attorney, Agent, or Firm* — Fujitsu Patent Center

(57) ABSTRACT

A data migration method includes creating, by a first control processor that controls a first cache memory storing first cache data cached from first storage data stored in a storage, first management information including information indicating a storage location of the first cache data on the first cache memory and information indicating whether or not the first storage data has been updated in accordance with an update of the first cache data for each block of a predetermined data size in the first cache memory, when a program that accesses the first cache data migrates to a different node, transmitting, by the first control processor, the first management information to a second control processor that controls a second cache memory capable of being accessed by the program after migration to the different node.

7 Claims, 23 Drawing Sheets

(51) Int. Cl.
*G06F 12/0893* (2016.01)
*G06F 12/0868* (2016.01)

(52) U.S. Cl.
CPC ...... *G06F 12/0868* (2013.01); *G06F 12/0893* (2013.01); *G06F 2212/283* (2013.01)

(58) Field of Classification Search
CPC ....... G06F 2212/1016; G06F 2212/283; G06F 2212/608
See application file for complete search history.

(56) References Cited

U.S. PATENT DOCUMENTS

| | | | | |
|---|---|---|---|---|
| 7,778,960 | B1 * | 8/2010 | Chatterjee | G06F 17/303 707/609 |
| 8,209,307 | B2 * | 6/2012 | Erofeev | G06F 17/30153 707/704 |
| 8,271,830 | B2 * | 9/2012 | Erofeev | G06F 11/1456 710/53 |
| 8,285,681 | B2 * | 10/2012 | Prahlad | G06F 17/30082 707/640 |
| 8,566,547 | B2 * | 10/2013 | Montgomery | G06F 3/0617 711/154 |
| 8,645,654 | B1 * | 2/2014 | Bailey | G06F 3/0605 711/165 |
| 8,930,947 | B1 * | 1/2015 | Derbeko | G06F 9/45558 711/113 |
| 9,032,160 | B1 * | 5/2015 | Natanzon | G06F 11/14 711/135 |
| 9,367,453 | B1 * | 6/2016 | Clark | G06F 12/08 |
| 9,792,150 | B1 * | 10/2017 | Rangari | G06F 9/4856 |
| 2002/0112083 | A1 * | 8/2002 | Joshi | G06F 17/30876 709/248 |
| 2003/0140198 | A1 * | 7/2003 | Ninose | G06F 12/0804 711/122 |
| 2011/0040943 | A1 * | 2/2011 | Kondo | G06F 3/0647 711/162 |
| 2013/0031307 | A1 * | 1/2013 | Itoh | G06F 3/0689 711/113 |
| 2015/0195141 | A1 * | 7/2015 | Luft | H04L 41/5006 709/223 |

FOREIGN PATENT DOCUMENTS

| | | |
|---|---|---|
| JP | 06-139087 | 5/1994 |
| JP | 07-271620 | 10/1995 |
| JP | 2011-210151 | 10/2011 |
| JP | 2012-234564 | 11/2012 |

* cited by examiner

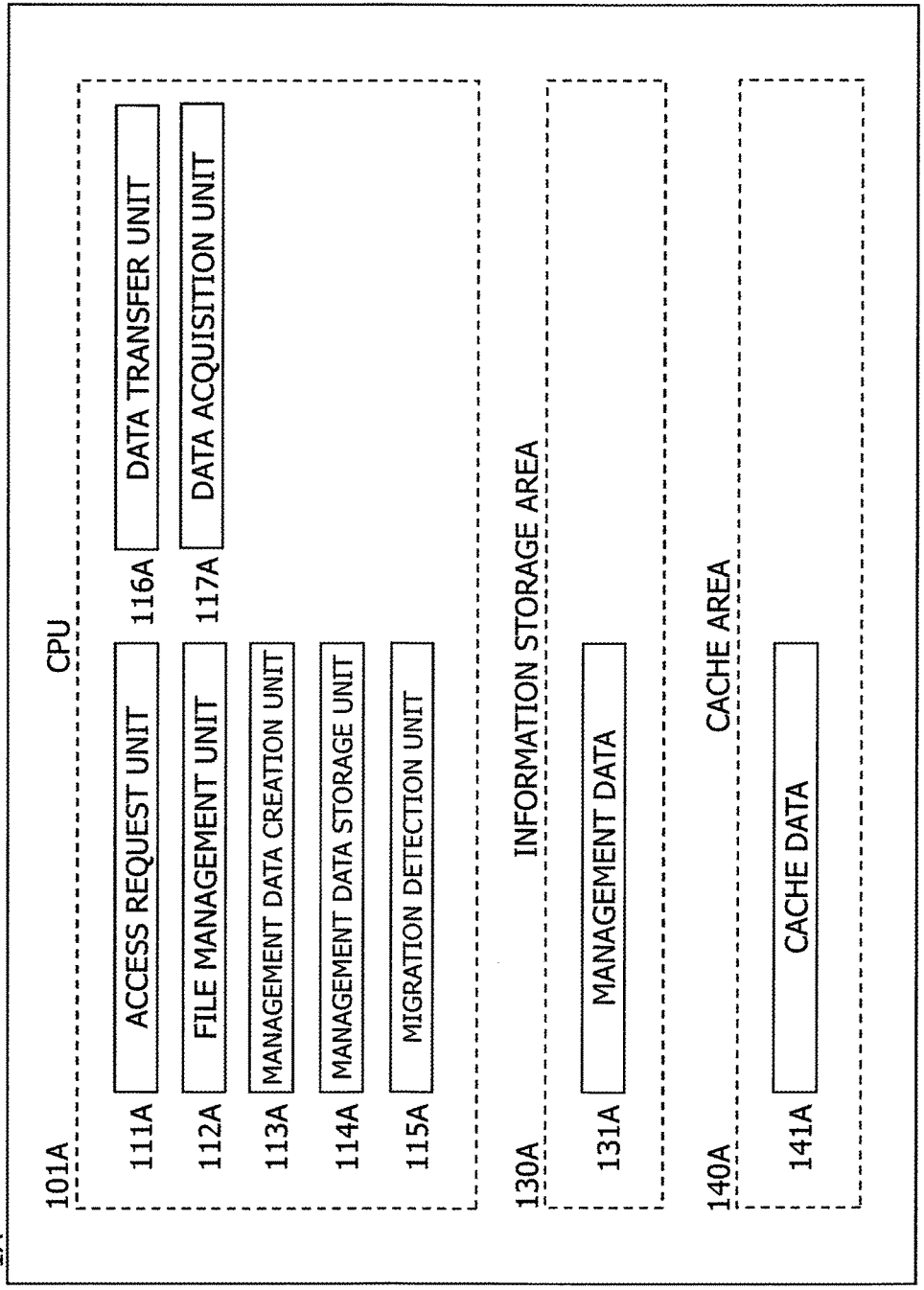

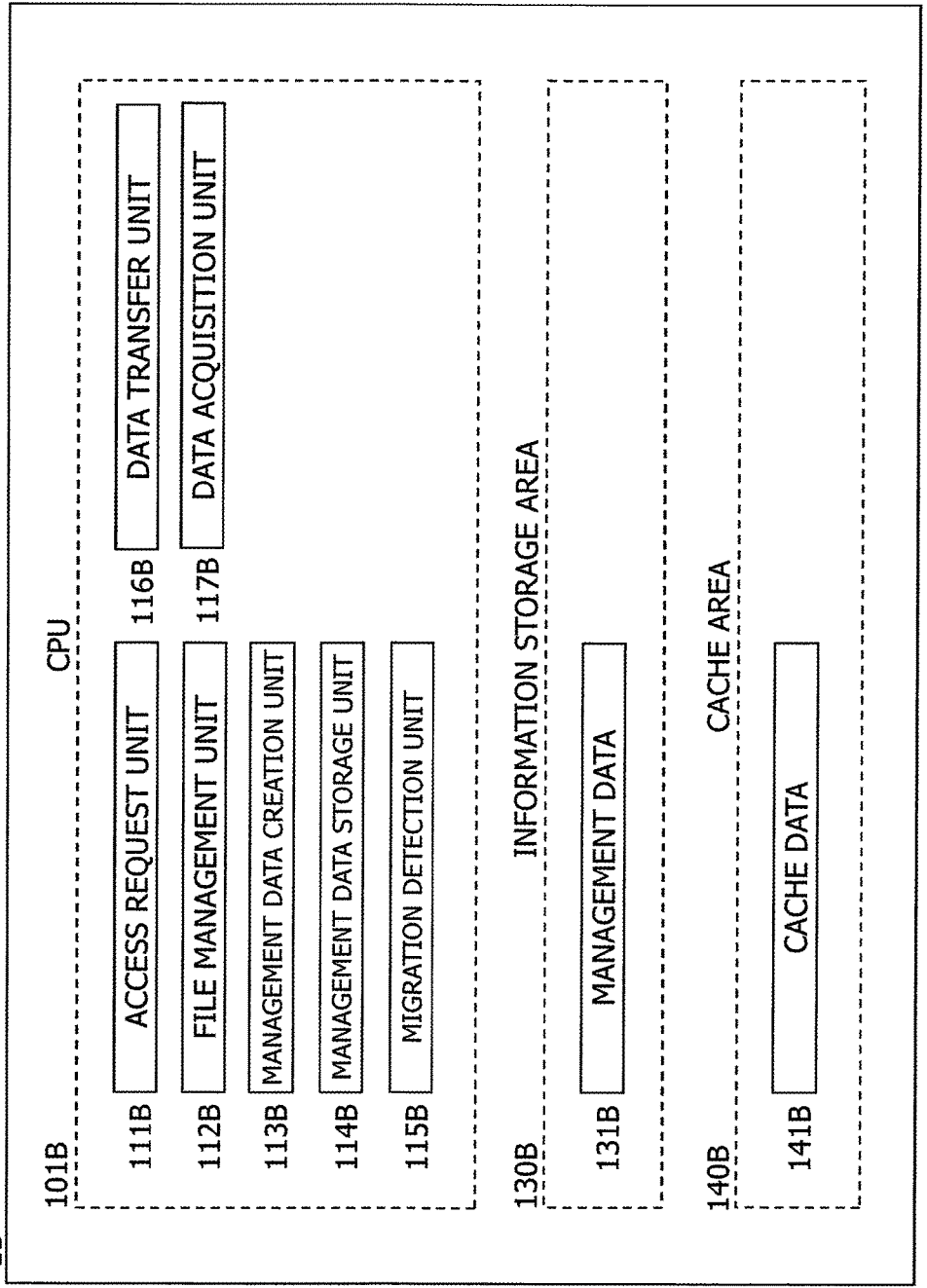

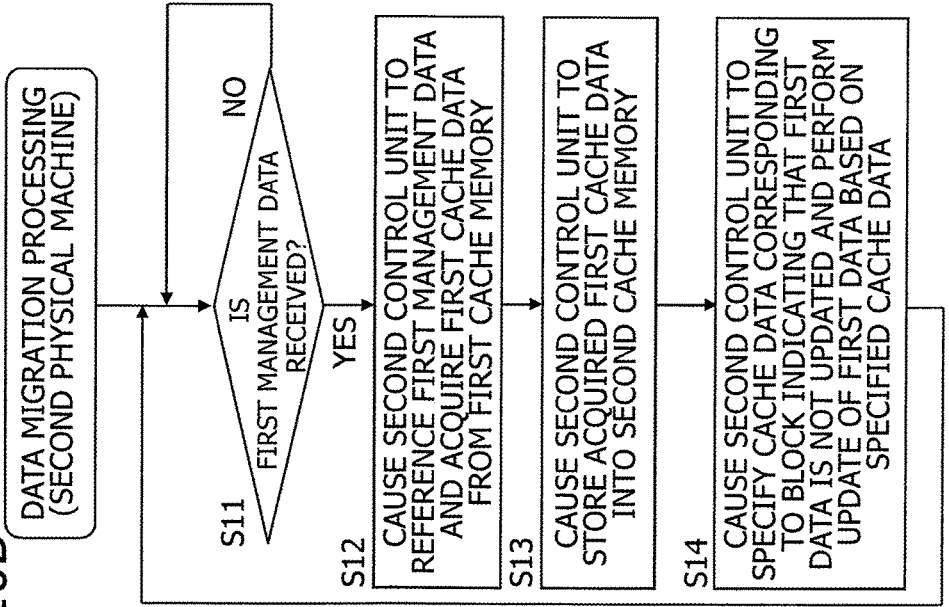
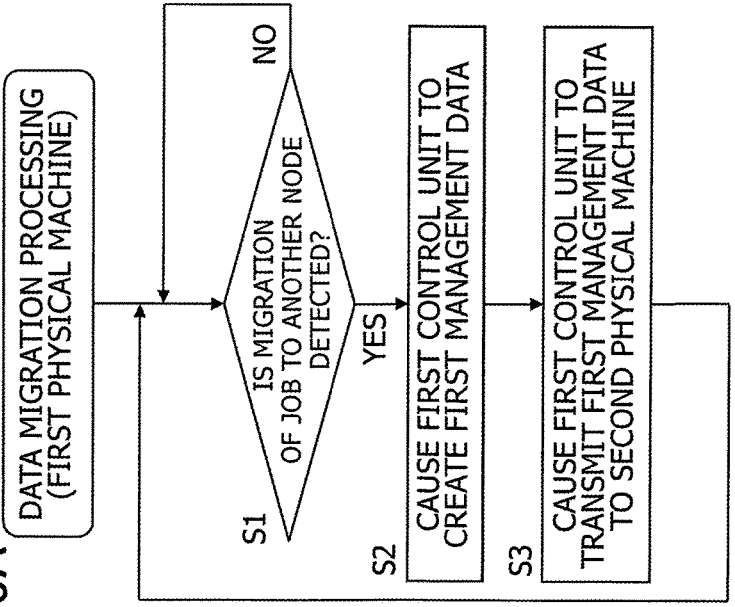

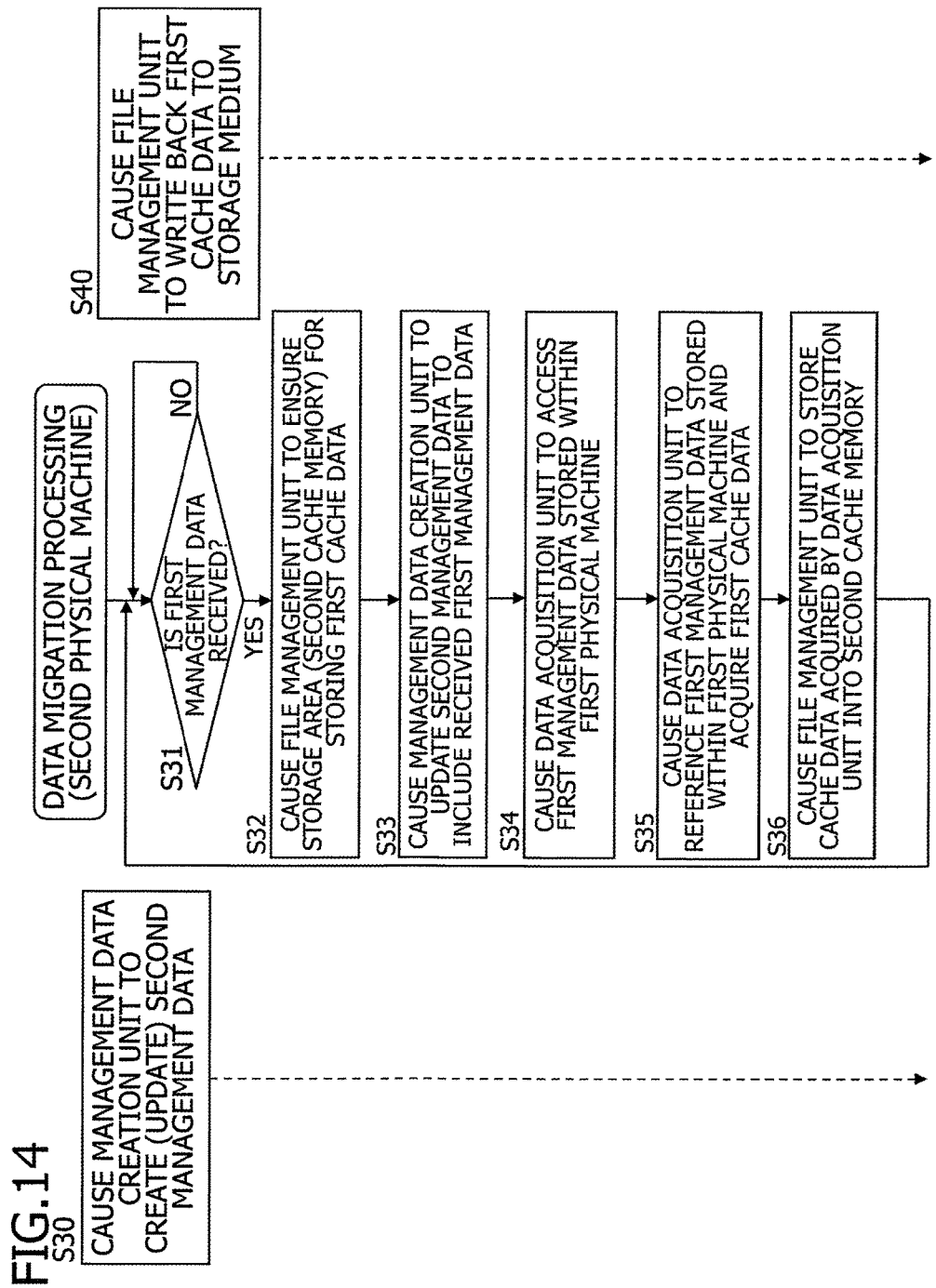

FIG.15A

| IDENTIFICATION ID | MIGRATION FLAG | MIGRATION SOURCE NODE ID | MIGRATION DESTINATION NODE ID | WRITEBACK FLAG | FILE IDENTIFICATION ID | OFFSET INFORMATION | STORAGE ADDRESS |
|---|---|---|---|---|---|---|---|
| 1 | | | | DONE | File1-3 | 2000 | 0x11223344 |
| 2 | | | | DONE | File2-1 | 1500 | 0x22334455 |
| 3 | | | | DONE | File2-3 | 1100 | 0x33445566 |
| 4 | | | | NOT DONE | File1-2 | 3500 | 0x44556677 |

FIG.15B

| IDENTIFICATION ID | MIGRATION FLAG | MIGRATION SOURCE NODE ID | MIGRATION DESTINATION NODE ID | WRITEBACK FLAG | FILE IDENTIFICATION ID | OFFSET INFORMATION | STORAGE ADDRESS |
|---|---|---|---|---|---|---|---|
| 1 | NOT DONE | No.1 | No.2 | DONE | File1-3 | 2000 | |
| 2 | NOT DONE | No.1 | No.2 | DONE | File2-1 | 1500 | |
| 3 | NOT DONE | No.1 | No.2 | DONE | File2-3 | 1100 | |
| 4 | NOT DONE | No.1 | No.2 | NOT DONE | File1-2 | 3500 | |

FIG.16A

| IDENTIFICATION ID | MIGRATION FLAG | MIGRATION SOURCE NODE ID | MIGRATION DESTINATION NODE ID | WRITEBACK FLAG | FILE IDENTIFICATION ID | OFFSET INFORMATION | STORAGE ADDRESS |
|---|---|---|---|---|---|---|---|
| 1 | | | | DONE | File2-1 | 1700 | 0x55443322 |
| 2 | | | | NOT DONE | File1-1 | 800 | 0x44332211 |
| 3 | | | | DONE | File1-1 | 2100 | 0x33221100 |

FIG.16B

| IDENTIFICATION ID | MIGRATION FLAG | MIGRATION SOURCE NODE ID | MIGRATION DESTINATION NODE ID | WRITEBACK FLAG | FILE IDENTIFICATION ID | OFFSET INFORMATION | STORAGE ADDRESS |
|---|---|---|---|---|---|---|---|
| 1 | NOT DONE | No.1 | No.2 | DONE | File1-3 | 2000 | |
| 2 | NOT DONE | No.1 | No.2 | DONE | File2-1 | 1500 | |
| 3 | NOT DONE | No.1 | No.2 | DONE | File2-3 | 1100 | |
| 4 | NOT DONE | No.1 | No.2 | NOT DONE | File1-2 | 3500 | |
| 5 | | | | DONE | File2-1 | 1700 | 0x55443322 |
| 6 | | | | NOT DONE | File1-1 | 800 | 0x44332211 |
| 7 | | | | DONE | File1-1 | 2100 | 0x33221100 |

FIG.17

| IDENTIFICATION ID | MIGRATION FLAG | MIGRATION SOURCE NODE ID | MIGRATION DESTINATION NODE ID | WRITEBACK FLAG | FILE IDENTIFICATION ID | OFFSET INFORMATION | STORAGE ADDRESS |
|---|---|---|---|---|---|---|---|
| 1 | | | | DONE | File1-3 | 2000 | 0x99887766 |
| 2 | | | | DONE | File2-1 | 1500 | 0x88776655 |
| 3 | | | | DONE | File2-3 | 1100 | 0x77665544 |
| 4 | | | | NOT DONE | File1-2 | 3500 | 0x66554433 |
| 5 | | | | DONE | File2-1 | 1700 | 0x55443322 |
| 6 | | | | NOT DONE | File1-1 | 800 | 0x44332211 |
| 7 | | | | DONE | File1-1 | 2100 | 0x33221100 |

FIG.19

| IDENTIFICATION ID | MIGRATION FLAG | MIGRATION SOURCE NODE ID | MIGRATION DESTINATION NODE ID | WRITEBACK FLAG | FILE IDENTIFICATION ID | OFFSET INFORMATION | STORAGE ADDRESS |
|---|---|---|---|---|---|---|---|
| 1 | NOT DONE | No.1 | No.2 | DONE | File1-3 | 2000 | |
| 2 | NOT DONE | No.1 | No.2 | DONE | File2-1 | 1500 | |
| 3 | | | | DONE | File2-3 | 1100 | 0x00112233 |
| 4 | NOT DONE | No.1 | No.2 | NOT DONE | File1-2 | 3500 | |
| 5 | | | | DONE | File2-1 | 1700 | 0x55443322 |
| 6 | | | | NOT DONE | File1-1 | 800 | 0x44332211 |
| 7 | | | | DONE | File1-1 | 2100 | 0x33221100 |

FIG.23

| IDENTIFICA-TION ID | MIGRATION FLAG | MIGRATION SOURCE NODE ID | MIGRATION DESTINATION NODE ID | WRITEBACK FLAG | FILE IDENTIF-ICATION ID | OFFSET INFORMATION | STORAGE ADDRESS | ACCESS TIME |
|---|---|---|---|---|---|---|---|---|
| 1 | NOT DONE | No.1 | No.2 | DONE | File1-3 | 2000 | | 2014/6/30 18:15:12 |
| 2 | NOT DONE | No.1 | No.2 | DONE | File2-1 | 1500 | | 2014/7/1 12:15:43 |
| 3 | NOT DONE | No.1 | No.2 | DONE | File2-3 | 1100 | | 2014/6/30 08:43:32 |
| 4 | NOT DONE | No.1 | No.2 | NOT DONE | File1-2 | 3500 | | 2014/7/1 21:01:27 |
| 5 | | | | DONE | File2-1 | 1700 | 0x55443322 | 2014/7/1 19:23:10 |
| 6 | | | | NOT DONE | File1-1 | 800 | 0x44332211 | 2014/6/29 23:21:43 |
| 7 | | | | DONE | File1-1 | 2100 | 0x33221100 | 2014/6/30 02:13:55 |

DATA MIGRATION METHOD AND DATA MIGRATION DEVICE

CROSS-REFERENCE TO RELATED APPLICATION

This application is based upon and claims the benefit of priority of the prior Japanese Patent Application No. 2014-158381, filed on Aug. 4, 2014, the entire contents of which are incorporated herein by reference.

FIELD

The present invention relates to a data migration method and a data migration device.

BACKGROUND

In a business system or the like in operation, the execution of a job is performed at a timing scheduled in advance, for example. A job is a set of programs that are run using a resource (e.g., CPU or memory) of a computer (hereinafter also referred to as node), for example. The programs are run in coordination to obtain a processing result.

During the execution of such a job, there are cases where a node in which the job is executed needs to be changed in accordance with the situation of a resource (memory, disk, or the like) of a node executing the job, for example. In this case, an operation manager stops a process of the job executed in the node before migration and migrates information (e.g., management information of the job or information relating to a user) needed for executing the job to a node of a migration destination, for example. The operation manager resumes the execution of the process of the migrated job in the node of the migration destination. (Hereinafter, this processing is also referred to as job migration). Accordingly, it is possible to change a node in which a job is executed flexibly in accordance with the situation of a resource of a node. (For example, see Japanese Laid-open Patent Publication No. 2012-234564 and Japanese Laid-open Patent Publication No. 2011-210151.)

During the execution of a job in a manner described above, there are cases where a file system that manages data access stores accessed data into a memory within a node, in the case where access to data stored in an external storage device (hereinafter also referred to as storage device) has occurred, for example. (Hereinafter, data stored in a memory is also referred to as cache data.) Accordingly, it is possible to acquire data without accessing the storage device, in the case of accessing data that has been accessed before by a job again. Therefore, it is possible to increase the efficiency of data access by a job. In the case where a job has updated cache data, the file system synchronizes the cache data and the data stored in the storage device at a predetermined timing. Accordingly, occurrence of access to the storage device every time a job updates cache data can be prevented.

In the case of executing job migration, the file system performs processing of synchronizing cache data and data stored in the storage device before the job migration is performed. Accordingly, it is possible for the file system to provide consistency of the data before and after the execution of the job migration. A job for which job migration has been executed (hereinafter also referred to as migrated job) acquires needed data by performing access to the storage device after resuming processing.

However, in the case where the difference of cache data and data stored in the storage device is large, for example, there are cases where the completion of job migration is delayed, since it takes relatively a longer time to implement data synchronization. In the case where job migration has been executed, the migrated job needs to access the storage device again for data stored in the memory before the job migration. Thus, in the case where job migration has been executed, the efficiency of data access by a migrated job is reduced.

SUMMARY

According to a first aspect of the embodiment, a data migration method includes creating, by a first control processor that controls a first cache memory storing first cache data cached from first storage data stored in a storage, first management information including information indicating a storage location of the first cache data on the first cache memory and information indicating whether or not the first storage data has been updated in accordance with an update of the first cache data for each block of a predetermined data size in the first cache memory, when a program that accesses the first cache data migrates to a different node, transmitting, by the first control processor, the first management information to a second control processor that controls a second cache memory capable of being accessed by the program after migration to the different node, first acquiring, by the second control processor, the first cache data from the first cache memory on the basis of the received first management information, and storing, by the second control processor, the acquired first cache data into the second cache memory, and specifying, by the second control processor, cache data corresponding to the block corresponding to the first storage data that is not updated among the stored first cache data on the basis of the received first management information, and first updating, by the second control processor, the first storage data on the basis of the specified cache data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a function block diagram of the physical machine in FIG. 7.

FIG. 9 is a function block diagram of the physical machine in FIG. 7.

FIG. 10A and FIG. 10B are flowcharts illustrating the outline of data migration processing in the first embodiment.

FIG. 14 is a flowchart illustrating the details of data migration processing in the first embodiment.

FIG. 15A and FIG. 15B are diagrams illustrating the details of the data migration processing in the first embodiment.

FIG. 16A and FIG. 16B are diagrams illustrating the details of the data migration processing in the first embodiment.

FIG. 17 is a diagram illustrating the details of the data migration processing in the first embodiment.

FIG. 19 is a diagram illustrating the data migration processing in the second embodiment.

FIG. 23 is a diagram illustrating the data migration processing in the fifth embodiment.

DESCRIPTION OF EMBODIMENTS

Configuration of Information Processing System

Figure 1:
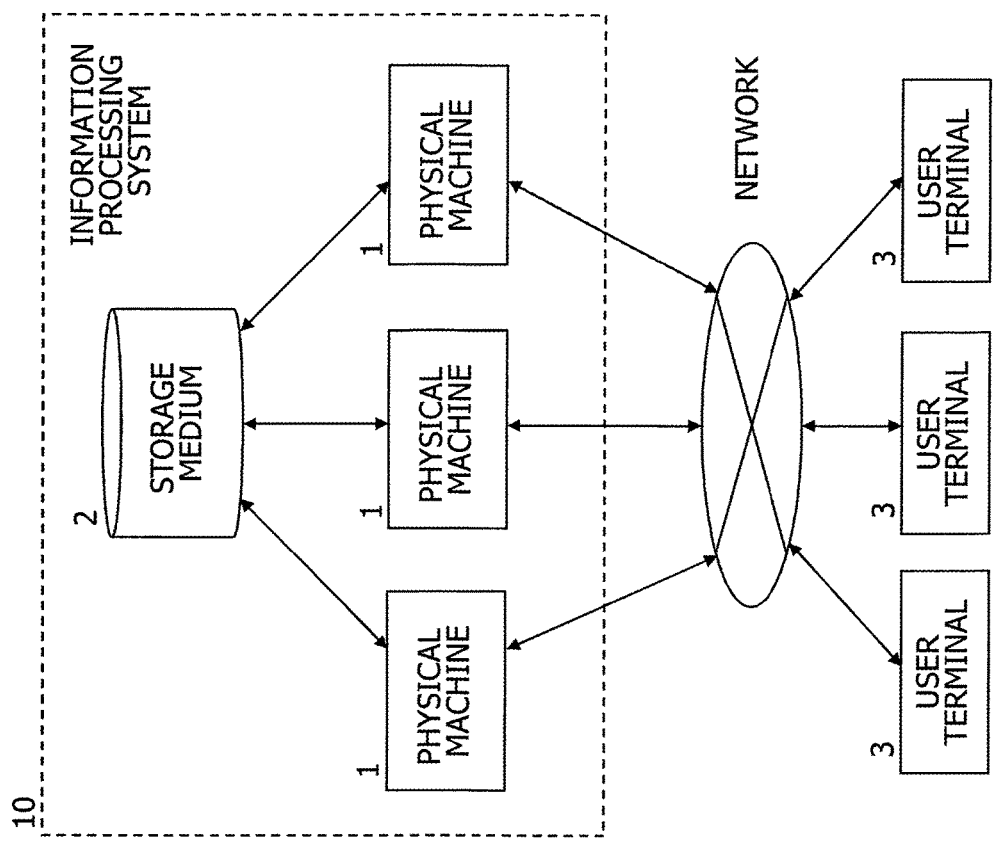
FIG. 1 is a diagram illustrating the overall configuration of an information processing system.

FIG. 1 is a diagram illustrating the overall configuration of an information processing system. An information processing system 10 illustrated in FIG. 1 is provided with a physical machine 1 and a storage medium 2. The information processing system 10 is capable of being accessed from a user terminal 3 through a network such as the Internet or an intranet, as illustrated in FIG. 1, for example.

The physical machine 1 is a physical machine with which a business system is constructed to provide a service to a user. By a CPU within the physical machine 1 running a job, each processing for realizing provision of a service with respect to a user is performed. With the job, reading of data (hereinafter also referred to as first data or first storage data) stored in the storage medium 2 or writing of data to the storage medium 2 along with the execution of processing is performed, for example. With an example in FIG. 1, a case where three physical machines are provided in the information processing system 10 will be described. However, a different number of physical machines may be provided.

[Data Access to Physical Machine]

Next, a specific example of data access by the physical machine 1 illustrated in FIG. 1 will be described. FIG. 2 to FIG. 6 are diagrams illustrating data access by the physical machine.

Figure 2:
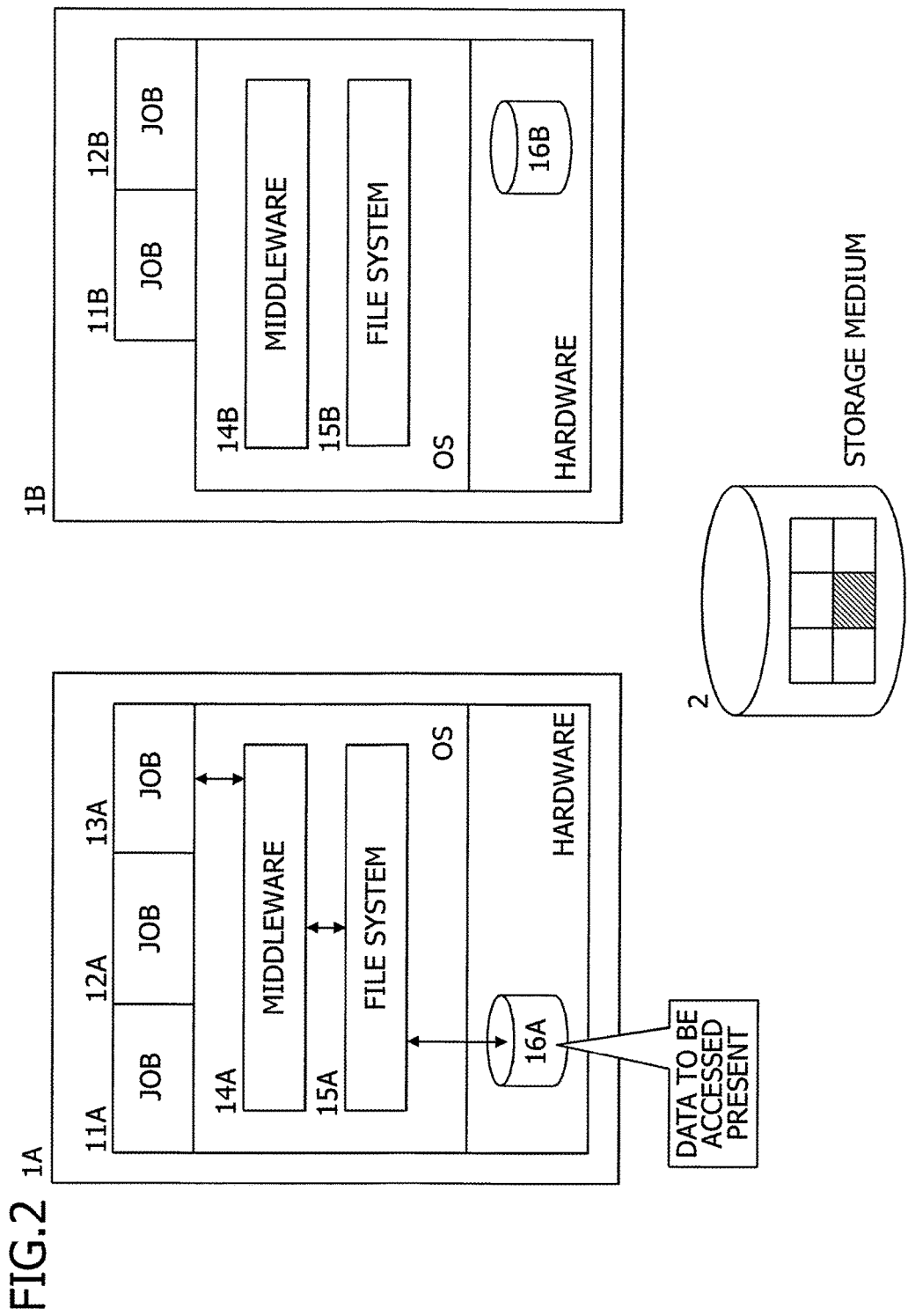
FIG. 2 is a diagram illustrating data access by the physical machine.

FIG. 2 is a diagram illustrating the configuration of a physical machine 1A and a physical machine 1B. The physical machine 1A and the physical machine 1B in FIG. 2 correspond to the physical machine 1 illustrated in FIG. 1. In an example illustrated in FIG. 2, jobs 11A, 12A, and 13A, middleware 14A, and a file system 15A (hereinafter also referred to as first control unit 15A) run on a CPU in the physical machine 1A. Hardware (e.g., memory) of the physical machine 1A is provided with a cache area 16A (hereinafter also referred to as cache memory 16A or first cache memory 16A) that is a storage area. In the example illustrated in FIG. 2, jobs 11B and 12B, middleware 14B, and a file system 15B (hereinafter also referred to as second control unit 15B) run on a CPU in the physical machine 1B. Hardware of the physical machine 1B is provided with a cache area 16B (hereinafter also referred to as cache memory 16B or second cache memory 16B) that is a storage area. In the example illustrated in FIG. 2, the middleware 14A and the file system 15A have a function of running on an OS within the physical machine 1A, for example. The middleware 14B and the file system 15B have a function of running on an OS within the physical machine 1B, for example.

In the case where an access request of data within the storage medium 2 has been received from the job 11A, 12A, or 13A running on the OS of the physical machine 1A in the example illustrated in FIG. 2, the middleware 14A performs an access request of the data to the file system 15A, for example. In the case where the access request of data has been received from the middleware 14A, the file system 15A accesses the cache area 16A. Thus, in the case where the data of which the access request is received is stored in the cache area 16A, the file system 15A returns the data stored in the cache area 16A to the job without accessing the storage medium 2.

That is, in the cache area 16A, data within the storage medium 2 that has been accessed before by the job 11A, 12A, or 13A is stored, for example. Therefore, in the case where an access request of data that has been accessed before by a job has been made, it is possible for the file system 15A to acquire the data without accessing the storage medium 2. Accordingly, it is possible for the file system 15A to enhance the efficiency of data access. The middleware 14B, the file system 15B, and the cache area 16B respectively have the same functions as the middleware 14A, the file system 15A, and the cache area 16A. Therefore, description is omitted.

Figure 3:
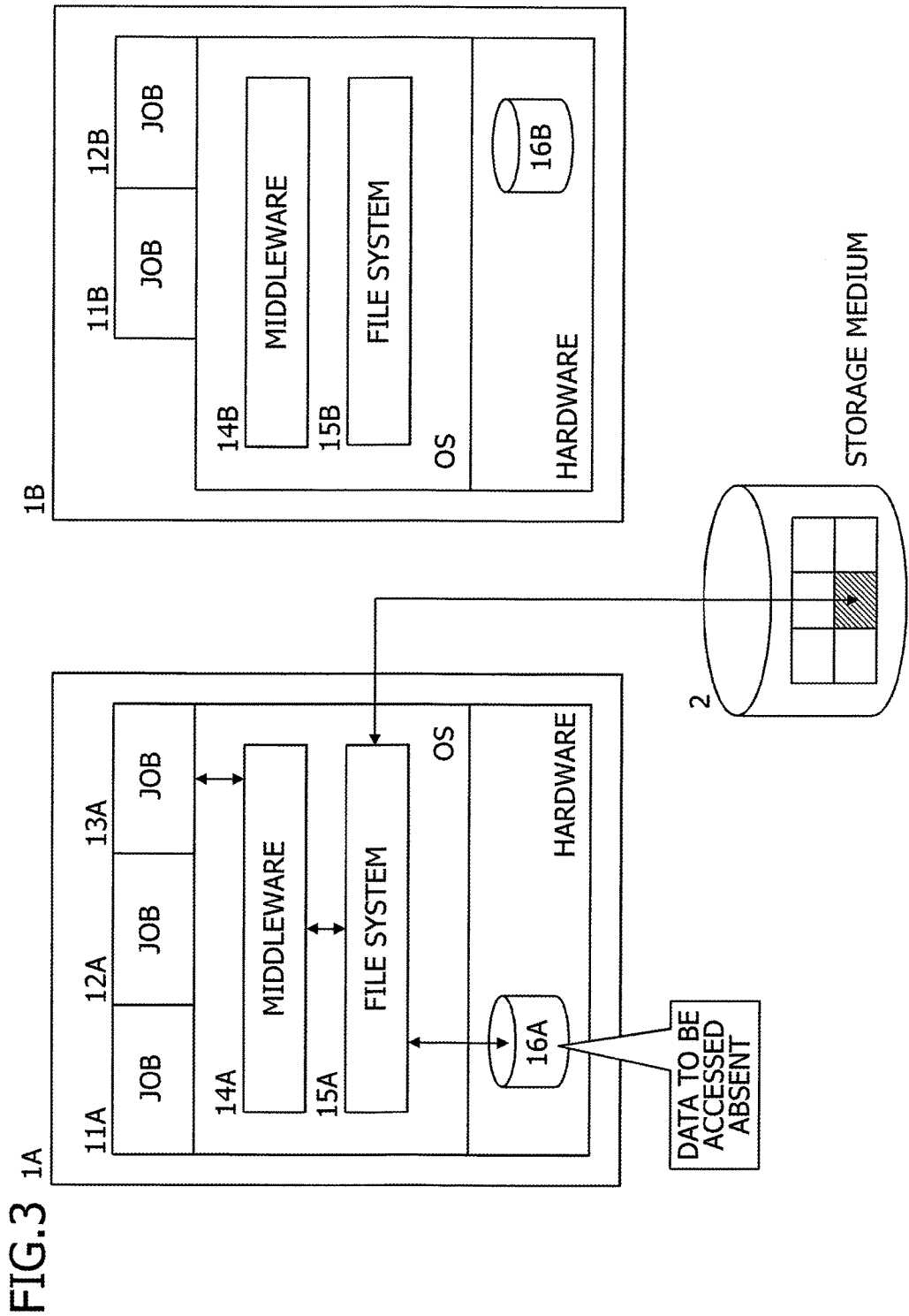
FIG. 3 is a diagram illustrating data access by the physical machine.

In the case where data of which an access request has been made from a job is not stored in the cache area 16A, as illustrated in FIG. 3, the file system 15A performs access to the storage medium 2 and acquires the data of which the access request has been made.

Figure 4:
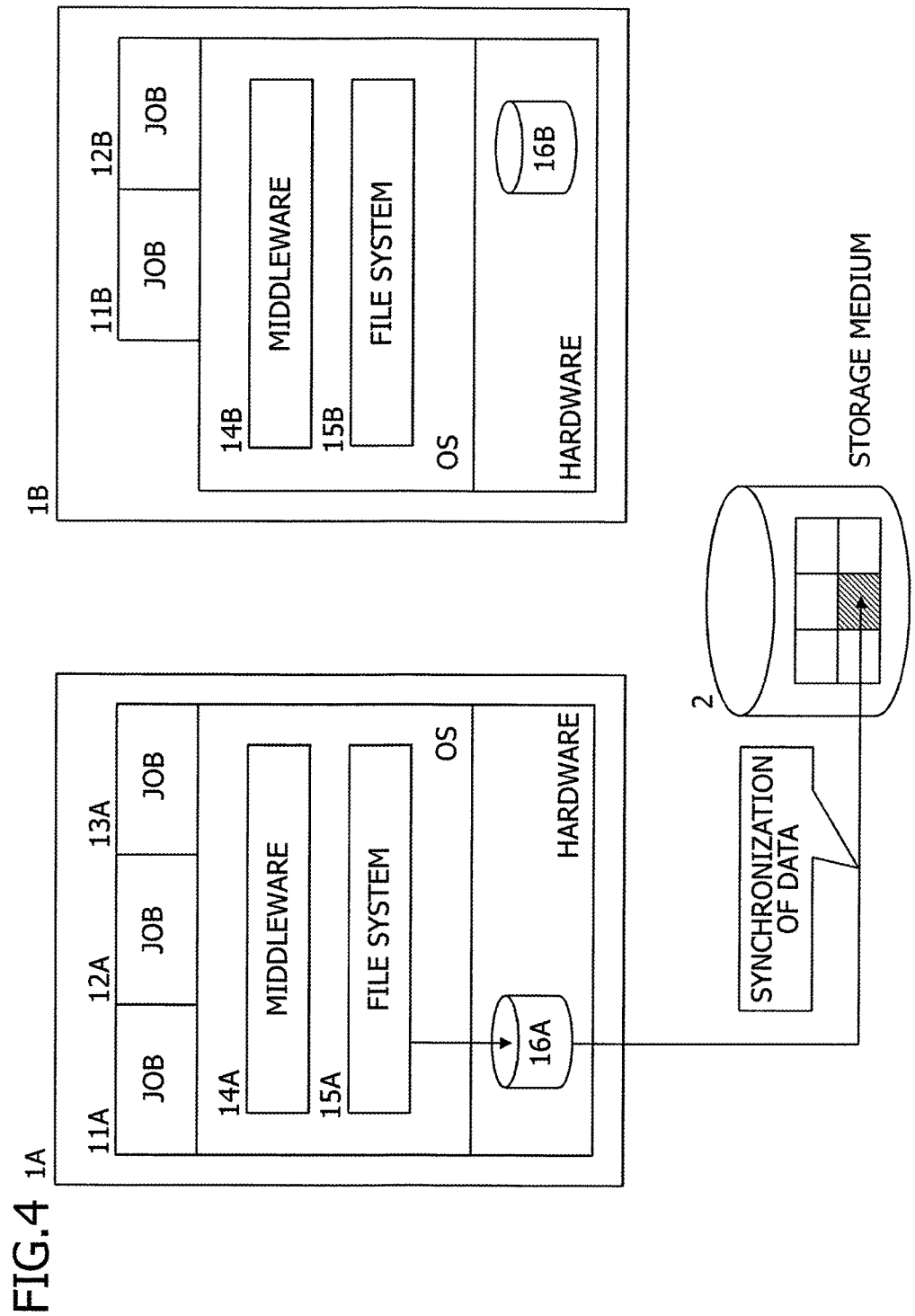
FIG. 4 is a diagram illustrating data access by the physical machine.

In the example illustrated in FIG. 2, there are cases where a job performs an update of data (writing of data) stored in the cache area 16A. In this case, a difference occurs between the data stored in the cache area 16A and data stored in the storage medium 2. Therefore, the file system 15A stores the updated data within the cache area 16A into the storage medium 2 at a predetermined timing, as illustrated in FIG. 4, for example. (Hereinafter, this is also referred to as writeback.) The predetermined timing may be, for example, when the storage area within the cache area 16A has run out. Accordingly, in the case where a job has updated only data stored in the cache area 16A, it is possible to synchronize the data stored in the cache area 16A and data stored in the storage medium 2.

[Job Migration]

Figure 5:
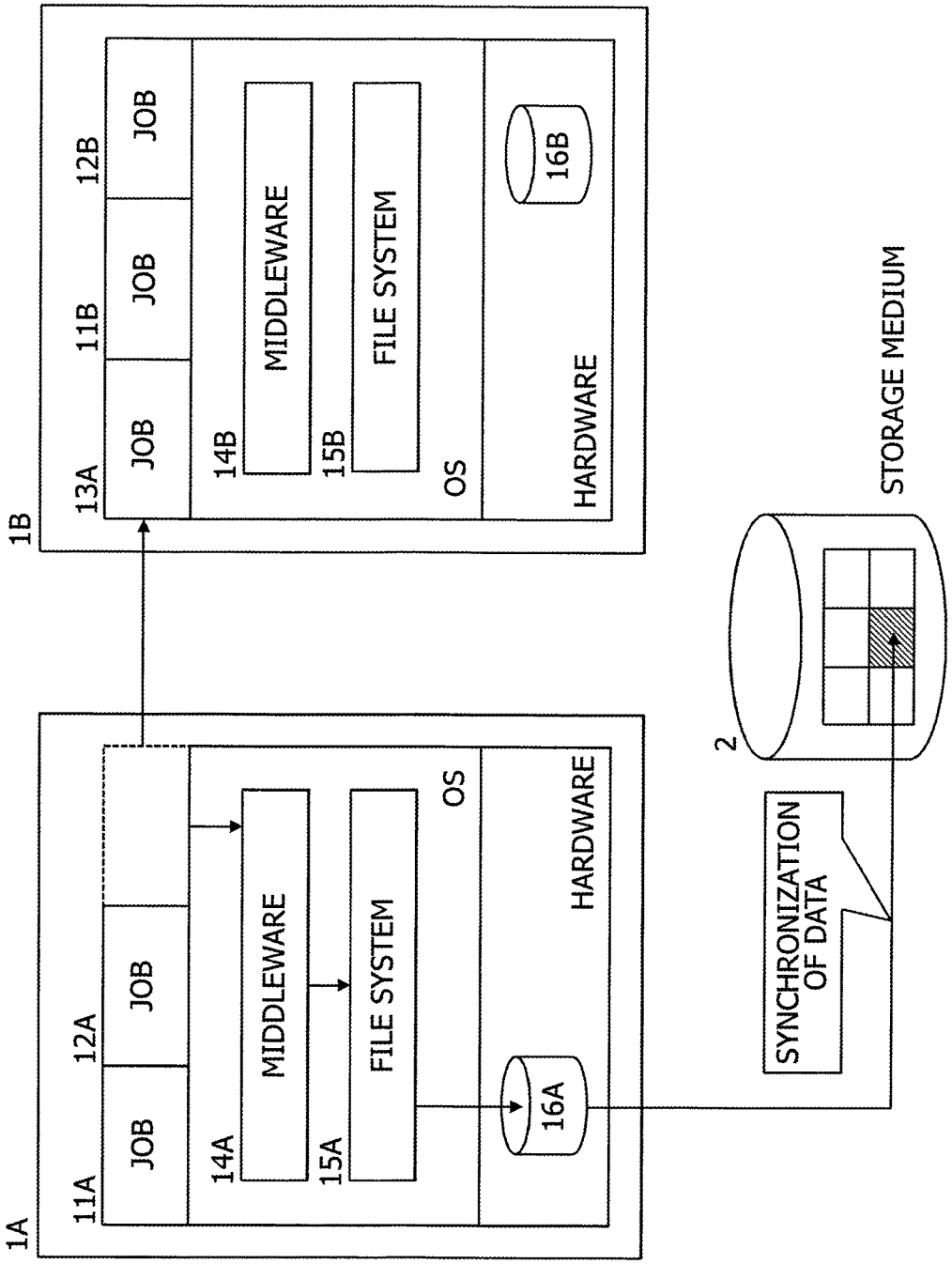
FIG. 5 is a diagram illustrating data access by the physical machine.
Figure 6:
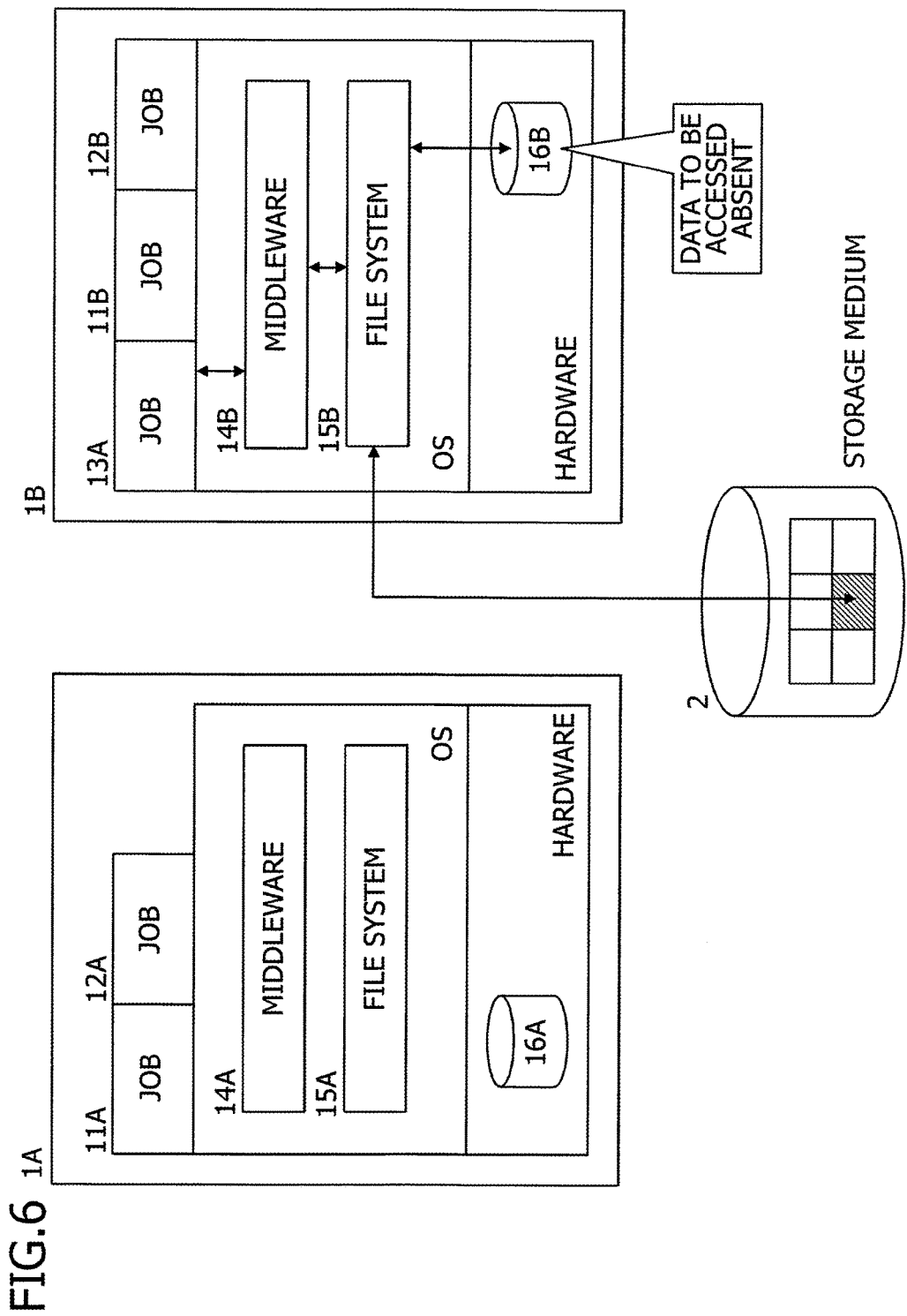
FIG. 6 is a diagram illustrating data access by the physical machine.

Next, job migration will be described. FIG. 5 and FIG. 6 are diagrams illustrating a specific example of job migration. Job migration is to change a node in which a job is executed, depending on the situation of a resource of a node that can be used by the job, for example. Specifically, for example, a process of a job executed in a node before migration is stopped by an operation manager, and information needed for executing the job is migrated to a node of a migration destination. In the node of the migration destination, the execution of the process of the migrated job is resumed.

Accordingly, it is possible to change a node in which a job is executed flexibly in accordance with the situation of a resource of a node.

In the case of executing job migration, the file system performs processing of synchronizing cache data and data stored in the storage device before the job migration is performed. Accordingly, it is possible for the file system to provide consistency of the data before and after the execution of the job migration. The migrated job acquires needed data by performing access to the storage device after resuming processing.

Specifically, the example illustrated in FIG. 5 is an example of a case (of executing job migration) where a job 13A that has been running within the physical machine 1A is migrated to the physical machine 1B. In the case where the middleware 14A has detected the start of job migration of the job 13A, for example, as illustrated in FIG. 5, the middleware 14A notifies the file system 15A of the start of job migration of the job 13A accordingly. The file system 15A performs synchronization of data stored in the cache area 16A and data stored in the storage medium 2. That is, the file system 15A performs a writeback of data that is not written back to the storage medium 2 among data stored in the cache area 16A, for example. Accordingly, it is possible for the job 13A after migration to access the data that has been stored in the cache area 16A by accessing the storage medium 2 after the start of running of the job 13A in the physical machine 1B.

However, in the case where job migration such as the above is to be performed and the difference of data stored in the cache area and data stored in the storage device is large, for example, there are cases where it takes relatively a longer time until synchronization of the data is completed.

In the case where an access request of data has been made from the job 13A that is a migrated job after the job migration is complete, the file system 15B first performs access to the cache area 16B, as illustrated in FIG. 6. Immediately after the execution of the job migration, data that has been stored in the cache area 16A (data that has been accessed by the job 13A) is not stored in the cache area 16B. Therefore, in this case, the file system 15B needs to access the storage medium 2 in accordance with the data access request from the job 13A. That is, in this case, the file system 15B needs to acquire the data that has been stored in the cache area 16A again from the storage medium 2. Therefore, every time job migration is performed, the efficiency of access to data by a job decreases.

Thus, in this embodiment, a migration source node of a job (the physical machine 1A) transmits information relating to cache data accessed by the job being migrated to another node to a migration destination node of the job (the physical machine 1B). The migration destination node of the job acquires and stores the cache data from the migration source node of the job, based on the received information relating to the cache data. Accordingly, it is possible to perform job migration without performing synchronization of cache data and data stored in the storage medium 2. When executing job migration, it is possible to directly migrate cache data to a migration destination node of the job from a migration source node of the job.

[Hardware Configuration of Physical Machine]

Figure 7:
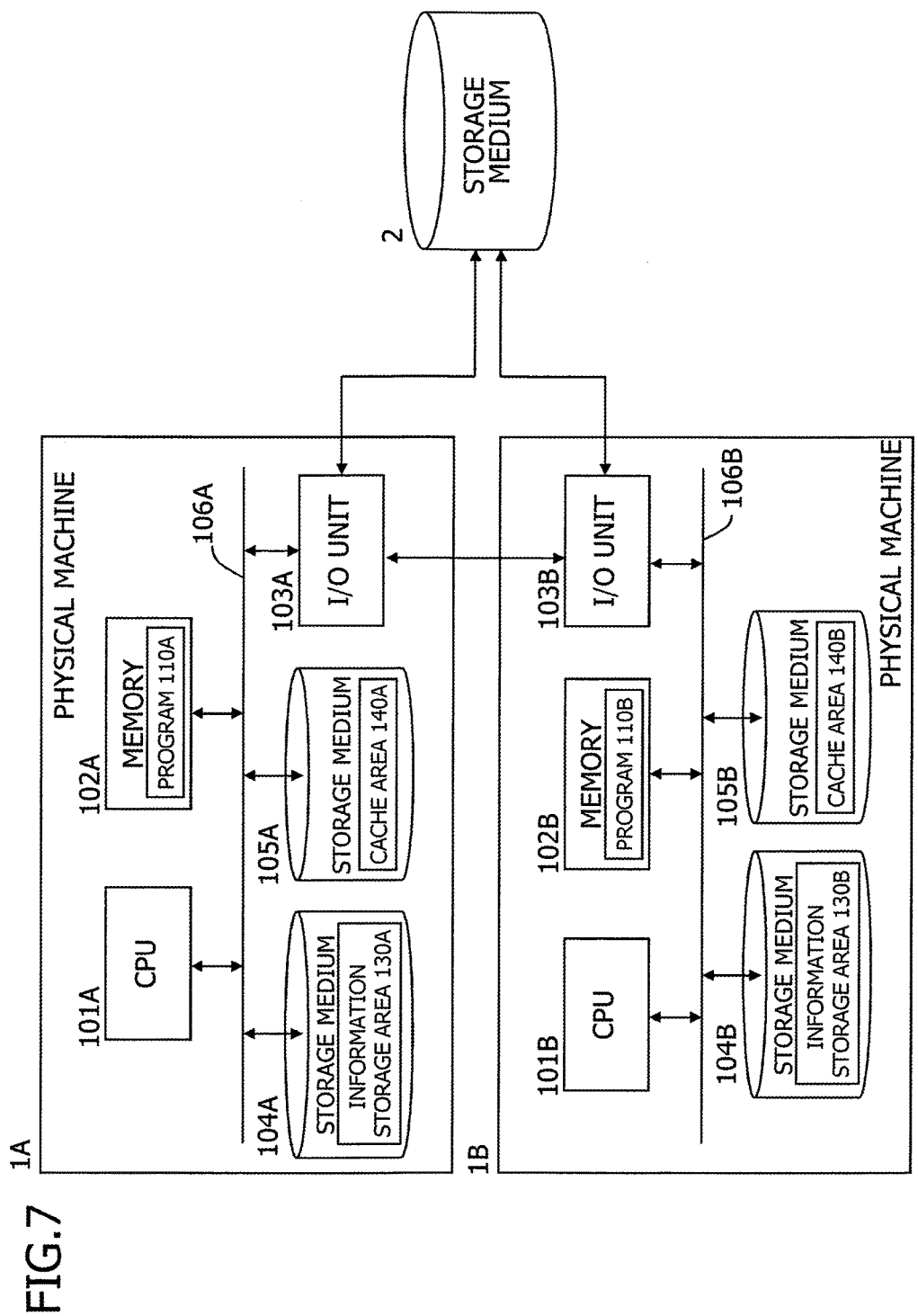
FIG. 7 is a diagram illustrating the hardware configuration of the physical machine.

Next, the configuration of the physical machine 1A and the physical machine 1B will be described. FIG. 7 is a diagram illustrating the hardware configuration of the physical machine. The physical machine 1A includes a CPU 101A that is a processor, a memory 102A, an external interface (I/O unit) 103A, a storage medium 104A, and a storage medium 105A. Each unit is connected to each other via a bus 106A. The storage medium 104A stores each program in a program storage area (not illustrated) within the storage medium 104A, for example. The program is, for example, a program 110A for performing processing (hereinafter also referred to as data migration processing) for migrating cache data stored in a cache area 140A within the storage medium 105A to a different physical machine. As illustrated in FIG. 7, when executing the program 110A, the CPU 101A loads the program 110A from the storage medium 104A into the memory 102A and performs data migration processing in coordination with the program 110A. The CPU 101A accesses the storage medium 2 as necessary when executing the program 110A, for example. The storage medium 104A includes an information storage area 130A that stores information used upon performing data migration processing, for example. The cache area 140A corresponds to the cache area 16A in FIG. 2 or the like, for example.

The physical machine 1B includes a CPU 101B that is a processor, a memory 102B, an external interface (I/O unit) 103B, a storage medium 104B, and a storage medium 105B. Each unit is connected to each other via a bus 106B. The storage medium 104B includes an information storage area 130B that stores information used upon performing data migration processing, for example. The storage medium 105B includes a cache area 140B, for example. Other configurations are similar to those in the physical machine 1A, and therefore detailed description is omitted.

[Software Configuration of Physical Machine]

FIG. 8 and FIG. 9 are function block diagrams of the physical machine in FIG. 7. By coordinating with the program 110A, the CPU 101A functions as an access request unit 111A, a file management unit 112A, a management data creation unit 113A, and a management data storage unit 114A, for example. By coordinating with the program 110A, the CPU 101A runs as a migration detection unit 115A, a data transfer unit 116A, and a data acquisition unit 117A, for example. In the information storage area 130A, management data 131A (hereinafter also referred to as management information 131A or first management information 131A) is stored, for example. In the cache area 140A, cache data 141A (hereinafter also referred to as first cache data 141A) is stored. The access request unit 111A, for example, corresponds to the middleware 14A in FIG. 2 or the like. The file management unit 112A, the management data creation unit 113A, the management data storage unit 114A, the migration detection unit 115A, the data transfer unit 116A, and the data acquisition unit 117A, for example, correspond to the file system 15A in FIG. 2 or the like.

By coordinating with the program 110B, the CPU 101B functions as an access request unit 111B, a file management unit 112B, a management data creation unit 113B, and a management data storage unit 114B, for example. By coordinating with the program 110B, the CPU 101B runs as a migration detection unit 115B, a data transfer unit 116B, and a data acquisition unit 117B, for example. In the information storage area 130B, management data 131B (hereinafter also referred to as management information 131B or second management information 131B) is stored, for example. In the cache area 140B, cache data 141B (hereinafter also referred to as second cache data 141B) is stored. The access request unit 111B, for example, corresponds to the middleware 14B in FIG. 2. The file management unit 112B, the management data creation unit 113B, the management data storage unit 114B, the migration detection unit 115B, the data transfer unit 116B, and the data acquisition unit 117B, for example, correspond to the file system 15B in FIG. 2. A case where a job running in the physical machine 1A is migrated to the physical machine 1B as illustrated in FIG. 2 or the like will be described below.

The access request unit 111A performs an access request or update request of data to the file management unit 112A described below, in the case where the access request or update request of data has been received from a job, for example. The access request unit 111A performs a writeback request of data to the file management unit 112A described below, in the case where the writeback request of data to the storage medium 2 has been received from a job, for example. The function of the access request unit 111B is similar.

The file management unit 112A performs control of the cache area 140A (hereinafter also referred to as first cache memory 140A) that stores the cache data 141A, for example. Specifically, the file management unit 112A accesses the cache area 140A or the storage medium 2 and performs the acquisition of data of which an access request has been made, based on the access request of data received from the access request unit 111A, for example. The file management unit 112A accesses the cache area 140A and performs an update of data of which an update request has been made, based on the update request of data received from the access request unit 111A, for example. Further, the file management unit 112A accesses the cache area 140A and writes back data stored in the cache area 140A to the storage medium 2, based on a writeback request of data received from the access request unit 111A, for example. The function of the file management unit 112B is similar.

The management data creation unit 113A creates the management data 131A relating to the cache data 141A, for example. The management data 131A is information including information indicating the storage location of the cache data 141A on the cache area 140A, for example. The management data 131A includes information indicating whether or not data within the storage medium 2 has been updated in accordance with an update of cache data for each block of a predetermined data size in the cache area 140A, for example. The predetermined data size is, for example, 4 KB. The details of the management data 131A will be described later. The management data storage unit 114A stores the management data 131A created by the management data creation unit 113A into the information storage area 130A, for example. The functions of the management data creation unit 113B and the management data storage unit 114B are similar.

The migration detection unit 115A detects job migration, in the case where job migration is executed (has been executed), for example. The detection by the migration detection unit 115A may be through receiving a notification accordingly upon the execution of job migration from a job for which the job migration is executed (has been executed), for example. The function of the migration detection unit 115B is similar.

The data transfer unit 116A transmits the management data 131A created by the management data creation unit 113A to the data acquisition unit 117B of the physical machine 1B, in the case where the migration detection unit 115A has detected the execution of job migration, for example. In the case where the data acquisition unit 117B of the physical machine 1B has received the management data 131A, the file management unit 112B of the physical machine 1B references the received management data 131A to acquire the cache data 141A from the cache area 140A, for example. Further, the file management unit 112B stores the acquired cache data 141A into the cache area 140B (hereinafter also referred to as second cache memory 140B). That is, in this case, the physical machine 1A transmits the management data 131A to the physical machine 1B, and the physical machine 1B references the received management data 131A to acquire the cache data 141A from the physical machine 1A. The file management unit 112B then specifies cache data corresponding to a block indicating that data in the storage medium 2 is not updated among the stored cache data 141A and performs an update of the data in the storage medium 2 based on the specified cache data.

The data transfer unit 116B may transmit the management data 131B created by the management data creation unit 113B to the data acquisition unit 117A, in the case where the migration detection unit 115B has detected the execution of job migration, for example. The management data 131B is information including information indicating the storage location of the cache data 141A upon storage of the cache data 141A into the cache area 140B, for example. With the data transfer unit 116A, in this case, the management data 131B received by the data acquisition unit 117A is referenced, and the cache data 141A is transmitted to the data acquisition unit 117B of the physical machine 1B and stored into the cache area 140B. That is, in this case, the physical machine 1B transmits the management data 131B to the physical machine 1A, and the physical machine 1A references the management data 131B and transmits the cache data 141A to the physical machine 1B.

First Embodiment

Figure 11:
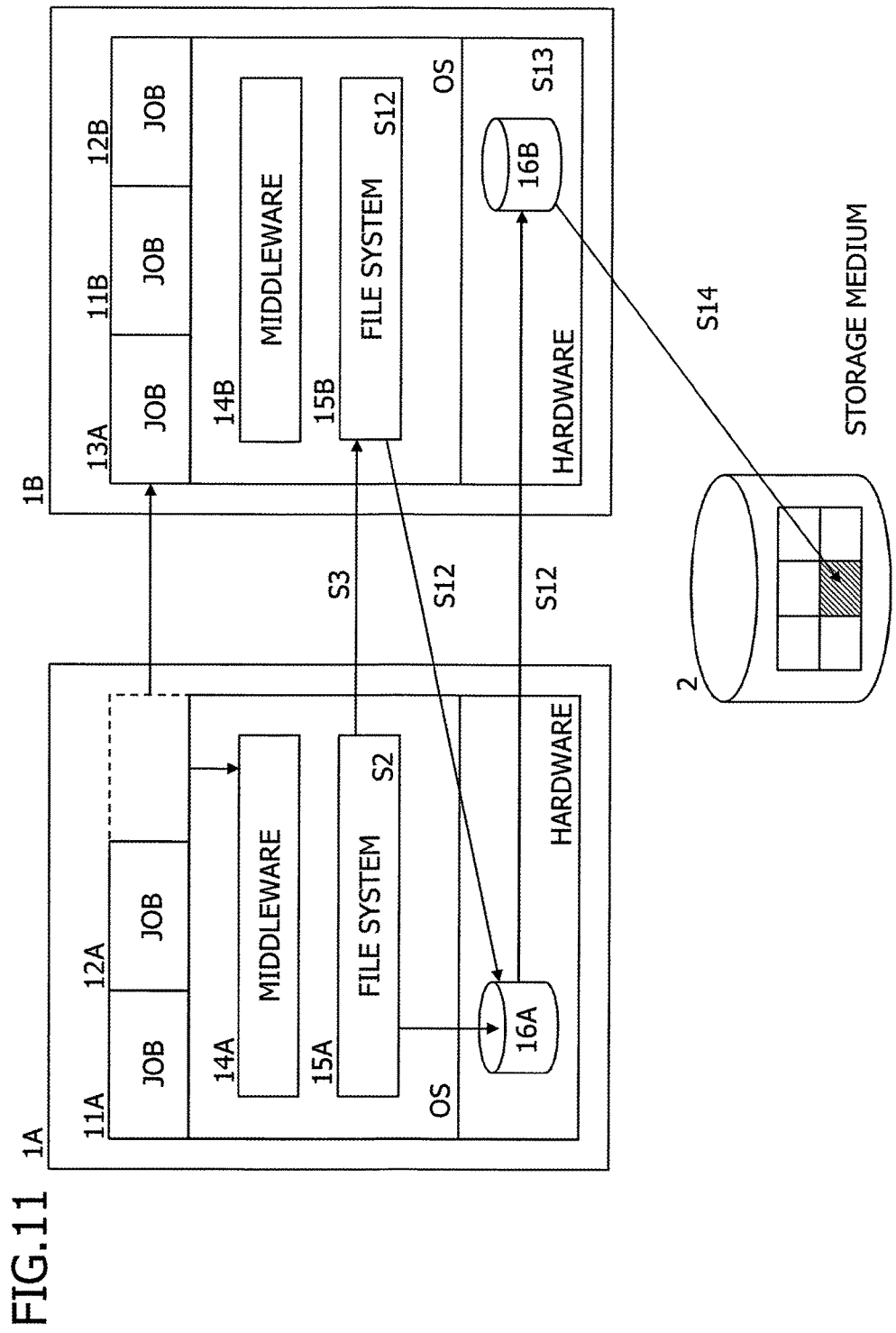
FIG. 11 is a diagram illustrating the outline of the data migration processing in the first embodiment.
Figure 12:
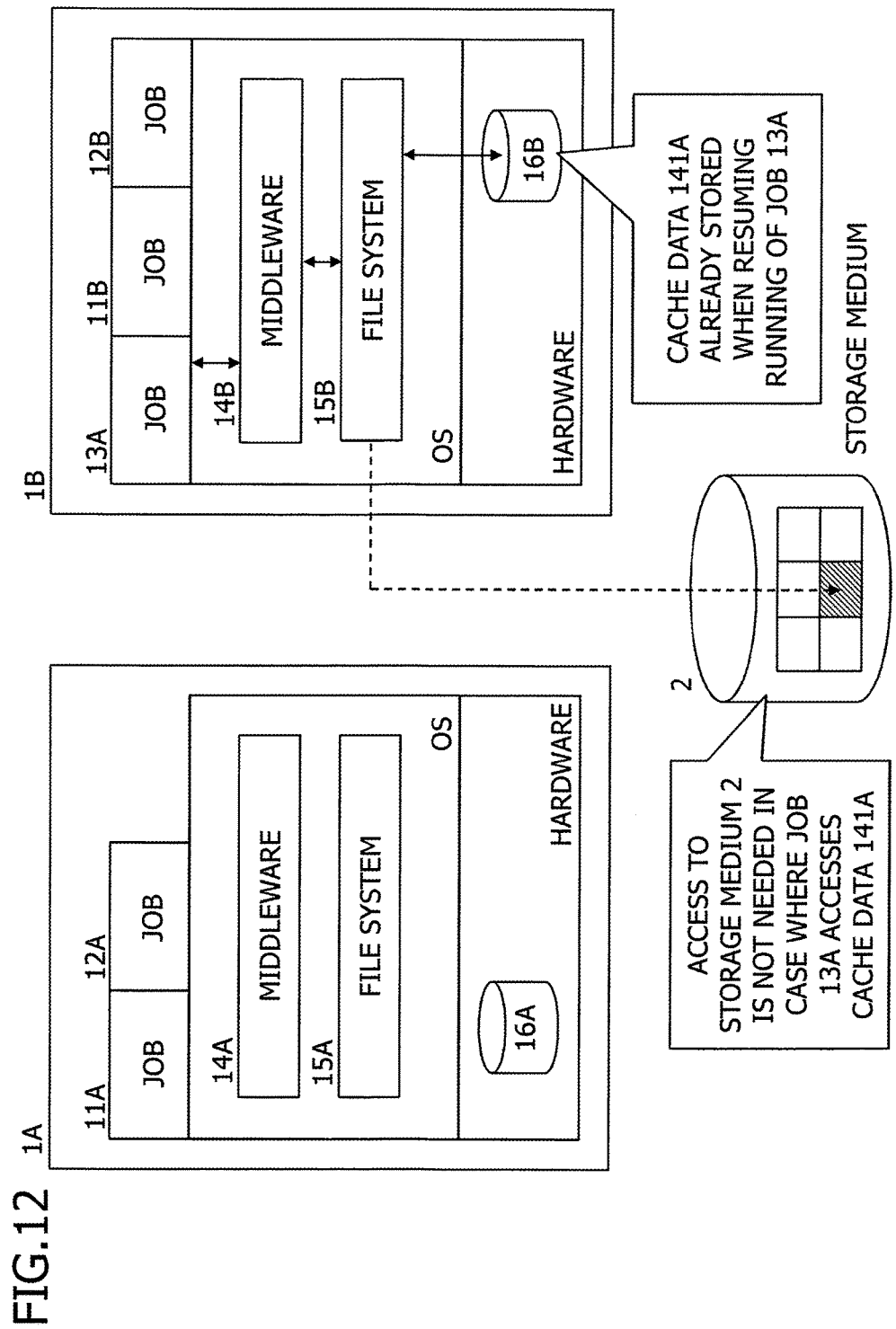
FIG. 12 is a diagram illustrating the outline of the data migration processing in the first embodiment.

Next, a first embodiment will be described. FIG. 10A and FIG. 10B are flowcharts illustrating the outline of data migration processing in the first embodiment. FIG. 11 and FIG. 12 are diagrams illustrating the outline of the data migration processing in the first embodiment. Referring to FIG. 11 and FIG. 12, the outline of the data migration processing in FIG. 10A and FIG. 10B will be described. In a similar manner to the case described with FIG. 5 and the like, a case of executing job migration of the job 13A running in the physical machine 1A to the physical machine 1B will be described below. With FIG. 11 and FIG. 12, points differing from FIG. 2 and the like already described will be described.

First, as illustrated in FIG. 10A, the physical machine 1A (the first control unit 15A of the physical machine 1A) waits until the execution of job migration of a job running in the physical machine 1A to another node (NO in S1), for example. In the case where the execution of job migration has been detected (YES in S1), the physical machine 1A creates the management data 131A (S2). As illustrated in FIG. 11, the physical machine 1A transmits the management data 131A to the physical machine 1B (S3).

As illustrated in FIG. 10B, the physical machine 1B (the second control unit 15B of the physical machine 1B) waits until the management data 131A is received from the physical machine 1A (NO in S11). When the management data 131A has been received from the physical machine 1A (YES in S11), the physical machine 1B references the management data 131A to access and acquire the cache data 141A stored in the cache area 140A within the physical machine 1A (S12), as illustrated in FIG. 11. Further, the physical machine 1B stores the acquired cache data 141A into the cache area 140B (S13). That is, the physical machine 1A in this embodiment transmits the management data 131A including information indicating the storage location of the cache data 141A to the physical machine 1B when executing job migration. Therefore, by referencing the received management data 131A, it is possible for the physical machine 1B to directly access the physical machine 1A and acquire the cache data 141A.

Returning to FIG. 10B, the physical machine 1B references the received management data 131A to specify cache data corresponding to a block indicating that data within the storage medium 2 is not updated among the cache data 141A stored in the cache area 140A, for example. The physical machine 1B updates data within the storage medium 2 based on the specified cache data (S14), for example. That is, the management data 131A received by the physical machine 1B includes information indicating whether or not cache data corresponding to each block is written back to the storage medium 2. Therefore, by referencing the management data 131A, the physical machine 1B can specify cache data that is not written back to the storage medium 2 among the cache data 141A. After the completion of job migration, it is possible for the physical machine 1B to write back the specified cache data to the storage medium 2 (S14), as illustrated in FIG. 11, for example. Accordingly, there is no need for the physical machine 1A to synchronize the cache data 141A in the cache area 140A and data within the storage medium 2 before the execution of job migration. Therefore, it is possible to shorten the time it takes to execute job migration.

Further, as illustrated in FIG. 12, it is possible for the job 13A that has started (resumed) running in the physical machine 1B after the completion of job migration to start running in a state where the cache data 141A stored in the physical machine 1A is stored in the cache area 140B. Therefore, there is no need for the job 13A to accesses the storage medium 2, in the case of accessing the cache data 141A. Accordingly, it is possible to prevent a decrease in the efficiency of data access by a job for which job migration has been performed.

In this manner, with the first embodiment, the first control unit 15A that controls the cache area 140A storing the cache data 141A creates the management data 131A. The first control unit 15A transmits the management data 131A to the second control unit 15B that controls the cache area 140B capable of being accessed by a program (job) after migration, upon migration of the program that accesses the cache data 141A to another node. Further, the second control unit 15B references the received management data 131A to acquire the cache data 141A from the cache area 140A and stores the acquired cache data 141A into the cache area 140B. Accordingly, it is possible to shorten the time it takes to implement job migration. It is possible to prevent a decrease in the efficiency of access to data by a job after the completion of job migration.

The data migration processing in this embodiment may be such that the physical machine 1B transmits the management data 131B to the physical machine 1A, and, based on the received management data 131B, the physical machine 1A transmits the cache data 141A to the physical machine 1B. Further, in this case, it may be such that the physical machine 1A transmits the management data 131A to the physical machine 1B, and the physical machine 1B writes back cache data that is not written back to the storage medium 2 among the cache data 141A.

Details of First Embodiment

Figure 13:
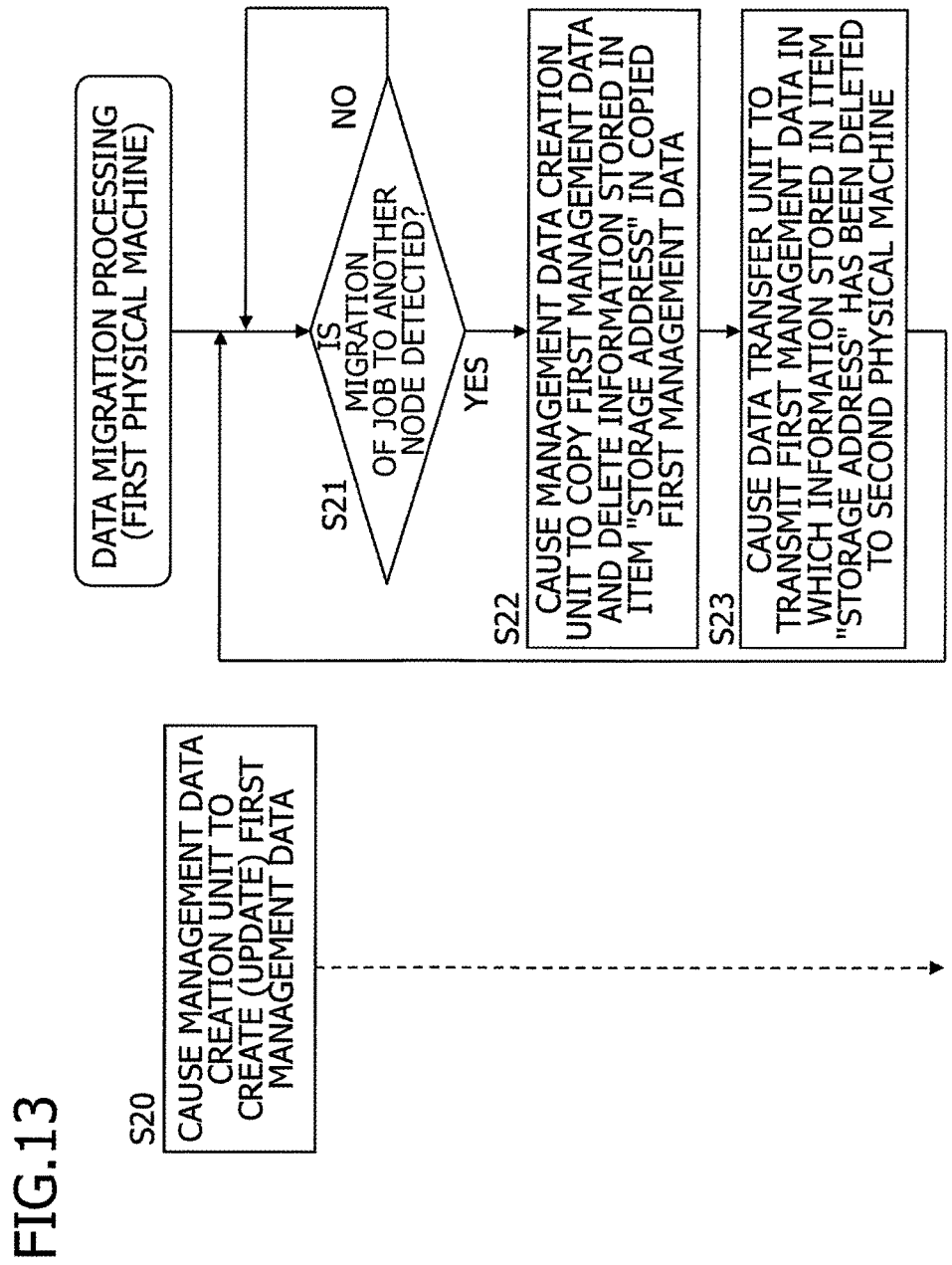
FIG. 13 is a flowchart illustrating the details of data migration processing in the first embodiment.

Next, the details of the first embodiment will be described. FIG. 13 and FIG. 14 are flowcharts illustrating the details of data migration processing in the first embodiment. FIG. 15A to FIG. 17 are diagrams illustrating the details of the data migration processing in the first embodiment.

Referring to FIG. 15A to FIG. 17, the details of the data migration processing in FIG. 13 and FIG. 14 will be described. Description is given below for a case where the physical machine 1A performs migration of the cache data 141A, and all cache data included in the cache data 141A is to be transmitted to the physical machine 1B.

[Data Migration Processing Executed in First Physical Machine]

First, data migration processing executed in the physical machine 1A will be described. The management data creation unit 113A of the physical machine 1A creates the management data 131A (S20), in the case where a predetermined condition has been satisfied, for example. The management data 131A may be created when data within the storage medium 2 is cached in the cache area 140A and be stored into the information storage area 130A. When the file management unit 112A of the physical machine 1A has detected the existence of new data (e.g., data newly stored within the storage medium 2), the management data 131A corresponding to the new data may be created. That is, the management data 131A may be created in order for the file management unit 112A to manage the correspondence of data within the storage medium 2 and the cache data 141A. A specific example of the management data 131A will be described later.

The access request unit 111A of the physical machine 1A waits until the execution of job migration of a job (e.g., the job 13A in FIG. 2 or the like) running in the physical machine 1A to another node is detected (NO in S21), for example. In the case where the execution of job migration has been detected (YES in S21), the management data creation unit 113A copies the management data 131A and performs an update of the copied management data 131A (hereinafter also referred to as transmit management data 131C), for example. Specifically, the management data creation unit 113A deletes information relating to the storage address of the cache data 141A on the cache area 140A included in the transmit management data 131C (S22), for example. The data transfer unit 116A of the physical machine 1A transmits the updated transmit management data 131C to the physical machine 1B (S23), for example. That is, while the details will be described later, the transmit management data 131C, after being transmitted to the physical machine 1B, functions as a part of the management data 131B for managing the correspondence of the cache data 141B in the physical machine 1B and data stored in the storage medium 2. Therefore, the management data creation unit 113A deletes the information relating to the storage address of the cache data 141A in the physical machine 1A from the transmit management data 131C. Accordingly, it is possible for the physical machine 1B to specify cache data migrated from the physical machine 1A among cache data managed by the management data 131B, in the case where the transmit management data 131C has started to function as a part of the management data 131B.

[Specific Example of Management Data of Migration Source Node]

FIG. 15A and FIG. 15B are specific examples of the management data 131A created in the physical machine 1A. FIG. 15A is a specific example of the management data 131A created by the management data creation unit 113A in S20. FIG. 15B is a specific example of the management data 131A updated by the management data creation unit 113A in S22.

The management data 131A illustrated in FIG. 15A and FIG. 15B includes items of an identification ID for identifying the management data 131A and a migration flag indicating whether or not the cache data 141A corresponding to the management data 131A has been migrated in the case where job migration has been performed, for example. The management data 131A illustrated in FIG. 15A and FIG. 15B includes items of a migration source node ID for identifying the migration source node of the cache data 141A and a migration destination node ID for identifying the migration destination node of the cache data 141A. The management data 131A illustrated in FIG. 15A and FIG. 15B includes an item of a writeback flag indicating whether or not a writeback to the storage medium 2 has been completed when the cache data 141A has been updated. The management data 131A illustrated in FIG. 15A and FIG. 15B includes an item of a file ID for identifying a file within the storage medium 2 including data corresponding to the cache data 141A. Further, the management data 131A illustrated in FIG. 15A and FIG. 15B includes items of offset information indicating the offset of data corresponding to the cache data 141A within a file and a storage address indicating the storage location of the cache data 141A within a cache memory.

Specifically, since the management data 131A in FIG. 15A is in a state before job migration is performed, information is not set in the items of the migration flag, the migration source node ID, and the migration destination node ID. For example, for the management data 131A of which the identification ID is "1" in the example in FIG. 15A, the writeback flag is set to "done" indicating that a writeback to the storage medium 2 is complete. Further, in the management data 131A of which the identification ID is "1," "File1-3" is set as the file identification ID, "2000" is set as the offset information, and "0x11223344" is set as the storage address. For example, for the management data 131A of which the identification ID is "4" in the example in FIG. 15A, the writeback flag is set to "not done" indicating that a writeback to the storage medium 2 is not complete. That is, it is possible for the file management unit 112A to specify the storage location of the cache data 141A by referencing the storage address within the management data 131A, for example. It is possible for the file management unit 112A to specify the storage location of data, which is corresponding to the cache data 141A, within the storage medium 2 by referencing the file identification ID and the offset information within the management data 131A, for example. Further, it is possible for the file management unit 112A to manage the cache data 141A and data stored within the storage medium 2 in correspondence with each other with the management data 131A. Other information in FIG. 15A is similar to the information described above, and therefore description is omitted.

The management data 131A illustrated in FIG. 15B is the management data 131A after the access request unit 111A of the physical machine 1A has detected the execution of job migration. Therefore, for the management data 131A illustrated in FIG. 15B, information is set in the items of the migration source node ID and the migration destination node ID that are information relating to job migration. Specifically, for the management data 131A of which the identification ID is "1" in the example in FIG. 15B, the migration flag is set to "not done" indicating that the migration of cache data is not complete. Further, for the management data 131A of which the identification ID is "1" in the example in FIG. 15B, "No. 1" is set as the migration source node ID, and "No. 2" is set as the migration destination node ID. That is, it is indicated that the cache data 141A indicated by the management data 131A in FIG. 15B is migrated (has been migrated) from node "No. 1" to node "No. 2" along with the execution job migration. In the management data 131A illustrated in FIG. 15B, information set in the storage address is deleted, unlike in the management data 131A illustrated in FIG. 15A. In the description below, node "No. 1" corresponds to the physical machine 1A, and node "No. 2" corresponds to the physical machine 1B. Other information in FIG. 15B is similar to the information described above, and therefore description is omitted.

[Data Migration Processing Executed in Second Physical Machine]

Next, data migration processing executed in the physical machine 1B will be described. The management data creation unit 113B of the physical machine 1B creates the management data 131B (S30), in the case where a predetermined condition has been satisfied, for example. That is, in a similar manner to the management data 131A being managed in the physical machine 1A such that data stored in the storage medium 2 and the cache data 141A correspond to each other, the management data 131B is managed such that data stored in the storage medium 2 and the cache data 141B correspond to each other. The predetermined condition may be the same condition for creating the management data 131A with the management data creation unit 113A of the physical machine 1A, for example.

The data acquisition unit 117B of the physical machine 1B waits until the transmit management data 131C is received from the physical machine 1A (NO in S31), for example. In the case where the transmit management data 131C has been received, the file management unit 112B of the physical machine 1B ensures a storage area for storing the cache data 141A acquired from the physical machine 1A (S32), for example. Specifically, the storage area may be a storage area within the cache area 140B storing the cache data 141B managed by the file management unit 112B. The management data creation unit 113B updates the management data 131B to include the transmit management data 131C (S33), for example. That is, the management data creation unit 113B causes the received transmit management data 131C to function as a part of the management data 131B, for example. A specific example of the management data 131B will be described below.

[Specific Example (1) of Management Data of Migration Source Node]

FIG. 16A and FIG. 16B are specific examples of the management data 131B created in the physical machine 1B. FIG. 16A is a specific example of the management data created by the management data creation unit 113B in S30. FIG. 16B is a specific example of the management data updated by the management data creation unit 113A in S33.

The management data 131B illustrated in FIG. 16A and FIG. 16B includes the same items as the management data 131A described with FIG. 15A and FIG. 15B. Specifically, in a similar manner to the management data 131A illustrated in the FIG. 15A, information is not set in the items of the migration flag, the migration source node ID, and the migration destination node ID in the management data 131B illustrated in FIG. 16A. For example, for the management data 131B of which the identification ID is "1" in the example in FIG. 16A, the writeback flag is set to "done." Further, in the management data 131B of which the identification ID is "1" in the example in FIG. 16A, "File2-1" is set as the file identification ID, "1700" is set as the offset information, and "0x55443322" is set as the storage address. Other information in FIG. 16A is similar to the information described above, and therefore description is omitted.

The management data 131B in FIG. 16B is a specific example of the management data updated by the management data creation unit 113B in S33. In the management data 131B in FIG. 16B, the management data 131B of which the identification IDs are "1" to "4" corresponds to the management data 131A (transmit management data 131C) of which the identification IDs are "1" to "4" in the example in FIG. 15B. In the management data 131B in FIG. 16B, the management data 131B of which the identification ID is "5" to "7" corresponds to the management data 131B of which the identification IDs are "1" to "3" in the example in FIG. 16A.

That is, the management data 131B in FIG. 16B is in an updated form including the management data 131A (transmit management data 131C) in FIG. 15B from the state of the management data 131B in FIG. 16A. Accordingly, it is possible for the file management unit 112B to manage the cache data 141A in a similar manner to the cache data 141B, after migration of the cache data 141A has been completed. Specifically, the management data 131A includes information relating to cache data for which a writeback to the storage medium 2 is not complete among the cache data 141A. Therefore, it is possible for the management data 131B illustrated in FIG. 16B to distinguish and manage cache data for which a writeback is complete and cache data for which a writeback is not complete among the cache data 141A. Thus, it is possible for the file management unit 112A of the physical machine 1A to perform migration of cache data directly between the physical machines without synchronizing the cache data 141A and data stored in the storage medium 2 upon the execution of job migration.

Returning to FIG. 14, the data acquisition unit 117B performs access to the management data 131A stored in the cache area 140A within the physical machine 1A (S34), for example. That is, there is a possibility of a time lag from when the data acquisition unit 117B receives the transmit management data 131C in S31 to when the data acquisition unit 117B references the management data 131B and acquires the cache data 141A in S35 described later. In this case, there is a possibility that the storage location within the cache area 140A storing the cache data 141A is changed before the cache data 141A is acquired. Therefore, upon performing the acquisition of the cache data 141A, the data acquisition unit 117B references the management data 131A stored in the physical machine 1A based on information within the management data 131B to perform access to the cache data 141A, for example. Accordingly, even in the case where the storage location within the cache area 140A storing the cache data 141A has been changed before the cache data 141A is acquired, it is possible for the data acquisition unit 117B to perform the acquisition of the cache data 141A.

Specifically, for example, the same information is set for the file identification ID and the offset information in the management data 131A and the management data 131B that manage the same cache data. This is because the storage location of data within the storage medium 2 corresponding to the cache data does not change, even in the case where the cache data has been migrated along with the execution of job migration. Thus, the file management unit 112B references "File2-3" that is the file identification ID and "1100" that is the offset information of the management data of which the identification ID is "3" among the management data 131B illustrated in FIG. 16B, for example. From the management data 131A illustrated in FIG. 16A, management data of which the file identification ID is "File2-3" and the offset information is "1100" is retrieved. Accordingly, it is possible for the file management unit 112B to acquire corresponding information within the management data 131A based on information within the management data 131B.

Returning to FIG. 14, the data acquisition unit 117B acquires the cache data 141A stored in the cache area 140A within the physical machine 1A (S35) based on the management data 131A corresponding to the management data 131B, for example. Subsequently, the file management unit 112B stores the cache data 141A acquired by the data acquisition unit 117B into the cache area 140B (S36), for example. In the case where the cache data 141A is stored into the cache area 140B, the management data creation unit 113B stores information indicating the storage location within the cache area 140B storing the cache data 141A into the storage address of the management data 131B, as illustrated in FIG. 17. Specifically, the management data creation unit 113B stores "0x99887766" as the storage address into the management data 131B of which the identification ID is "1," as illustrated in FIG. 17, for example. Further, the management data creation unit 113B deletes information of the migration flag, the migration source node ID, and the migration destination node ID, as illustrated in FIG. 17. Accordingly, it is possible for the management data creation unit 113B to manage the cache data 141A stored in the cache area 140B and the cache data 141B stored in the cache area 140B in the same manner. Other information in FIG. 17 is similar, and therefore description is omitted.

A migrated job may start running not only after S36 in the flowchart illustrated in FIG. 14 but also after S33 and before S34 in the flowchart illustrated in FIG. 14, for example. That is, a migrated job may resume running before the cache data 141A is migrated to the cache area 140B within the physical machine 1B. In this case, it may be such that the data acquisition unit 117B acquires all or a part of the cache data 141A stored in the cache area 140A only when an access request of data included in the cache data 141A has been made from the migrated job.

Returning to FIG. 14, the file management unit 112B references the management data 131B at a predetermined timing to specify cache data for which a writeback to the storage medium 2 is not complete among the cache data 141A, for example. The file management unit 112B performs a writeback to the storage medium 2 (S40), for example. The predetermined timing may be, for example, when the storage area within the cache area 140B has run out.

Second Embodiment

Figure 18:
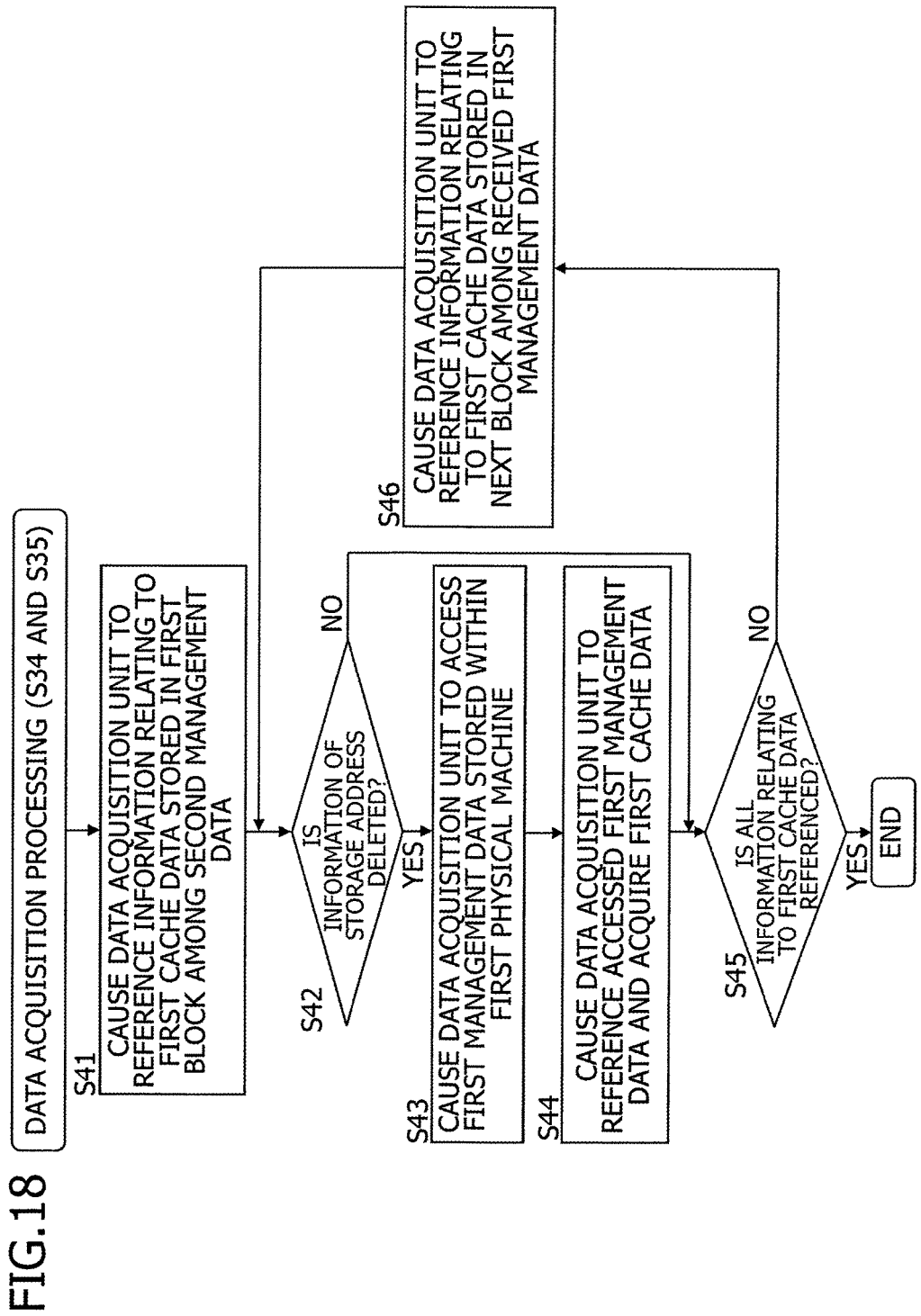
FIG. 18 is a flowchart illustrating data migration processing in the second embodiment.

Next, a second embodiment will be described. FIG. 18 is a flowchart illustrating data migration processing in the second embodiment. FIG. 19 is a diagram illustrating the data migration processing in the second embodiment. Referring to FIG. 19, the data migration processing in FIG. 18 will be described.

In the second embodiment, the file management units 112A and 112B manage cache data for each block of a predetermined data size (e.g., 4 KB). Only cache data that satisfies a predetermined condition among the cache data 141A stored in the cache area 140A is migrated to the physical machine 1B, for example. Accordingly, migration can be performed in order from cache data with high priority along with job migration. The physical machine 1A can perform only a bare minimum of migration of cache data to the physical machine 1B. Therefore, it is possible to shorten the processing time it takes until job migration is complete. By describing the details of S34 and S35 in FIG. 14, the details of the data migration processing in the second embodiment will be described below. Hereinafter, processing in S34 and S35 in FIG. 14 is also referred to as data acquisition processing. Other processing in the second embodiment is the same as the processing in the first embodiment described with FIG. 13 and FIG. 14, and therefore description is omitted herein.

In FIG. 18, the data acquisition unit 117B of the physical machine 1B first references information relating to the cache data 141A stored in the first block among the management data 131B (S41), for example. That is, in the second embodiment, the data acquisition unit 117B references the management data 131B to determine in units of blocks whether or not cache data needs to be migrated, upon performing migration of the cache data 141A. Hereinafter, a block on which the data acquisition unit 117B performs determination is also referred to as determination block.

Next, the data acquisition unit 117B determines whether or not information of the storage address of the management data 131B corresponding to the determination block is deleted (S42). In the case where information of the storage address is deleted (YES in S42), the data acquisition unit 117B accesses the management data 131A stored within the physical machine 1A (S43), in a similar manner to S34 in FIG. 14, for example. Further, the data acquisition unit 117B references the management data 131A within the physical machine 1A to acquire cache data stored in the determination block (S44), for example. In the case where information of the storage address is not deleted (NO in S42), the data acquisition unit 117B does not perform the acquisition of the cache data stored in the determination block. That is, there are cases where a migrated job starts running in the physical machine 1B after the data acquisition unit 117B has received the management data 131A (transmit management data 131C) in S31 in FIG. 14 and before the data acquisition unit 117B acquires the cache data 141A in S44. There are cases where the job that has started running before the data acquisition unit 117B acquires the cache data 141A in S44 acquires the same data as data included in the cache data 141A from the storage medium 2. In this case, the data acquired from the storage medium 2 by the job is stored in the cache area 140B. Therefore, it is not needed for the data acquisition unit 117B to acquire the same data from the physical machine 1A. Thus, in this case, it is possible for the data acquisition unit 117B to reduce the processing load of a CPU and the time it takes to migrate cache data by migrating only cache data not stored in the cache area 140B among the cache data 141A.

Returning to FIG. 18, the data acquisition unit 117B references the management data 131B, for example. In the case where determination on cache data stored in every block has ended (YES in S45), the data acquisition processing is ended. In the case where determination on cache data stored in every block has not ended (NO in S45), the data acquisition unit 117B references the next block (S46) and continues the data acquisition processing, for example. A specific example of the data migration processing in the second embodiment will be described below. The identification IDs of the management data 131B correspond to respective blocks in the description given below.

FIG. 19 is a diagram illustrating a case where a migrated job has accessed the storage medium 2 before the data acquisition unit 117B acquires the cache data 141A from the physical machine 1A. Specifically, FIG. 19 is an example of a case where a job has accessed the storage medium 2 after the state of FIG. 16B, and data of which the identification ID is "3" has been stored into the cache area 140B. Therefore, in the storage address of the management data 131B of which the identification ID is "3," "0x00112233" that is the storage address on the cache area 140B storing data within the storage medium 2 accessed by the job is stored. Further, information of the migration flag, the migration source node ID, and the migration destination node ID of the management data 131B of which the identification ID is "3" is deleted. Accordingly, in the case where the data acquisition unit 117B acquires the cache data 141A, it is possible for the data acquisition unit 117B to reference the management data 131B and determine that the acquisition of cache data corresponding to the management data 131B of which the identification ID is "3" is not needed.

That is, in the data migration processing in the second embodiment, the data acquisition unit 117B performs migration only of cache data stored in a block in which the storage address of the management data 131B is deleted among the cache data 141A. Accordingly, the data acquisition unit 117B can be prevented from acquiring, from the physical machine 1A, data that has been accessed by a migrated job and stored into the cache area 140B. Therefore, it is possible to further reduce the processing load of the CPU and the time needed for migration of cache data.

Third Embodiment

Figure 20:
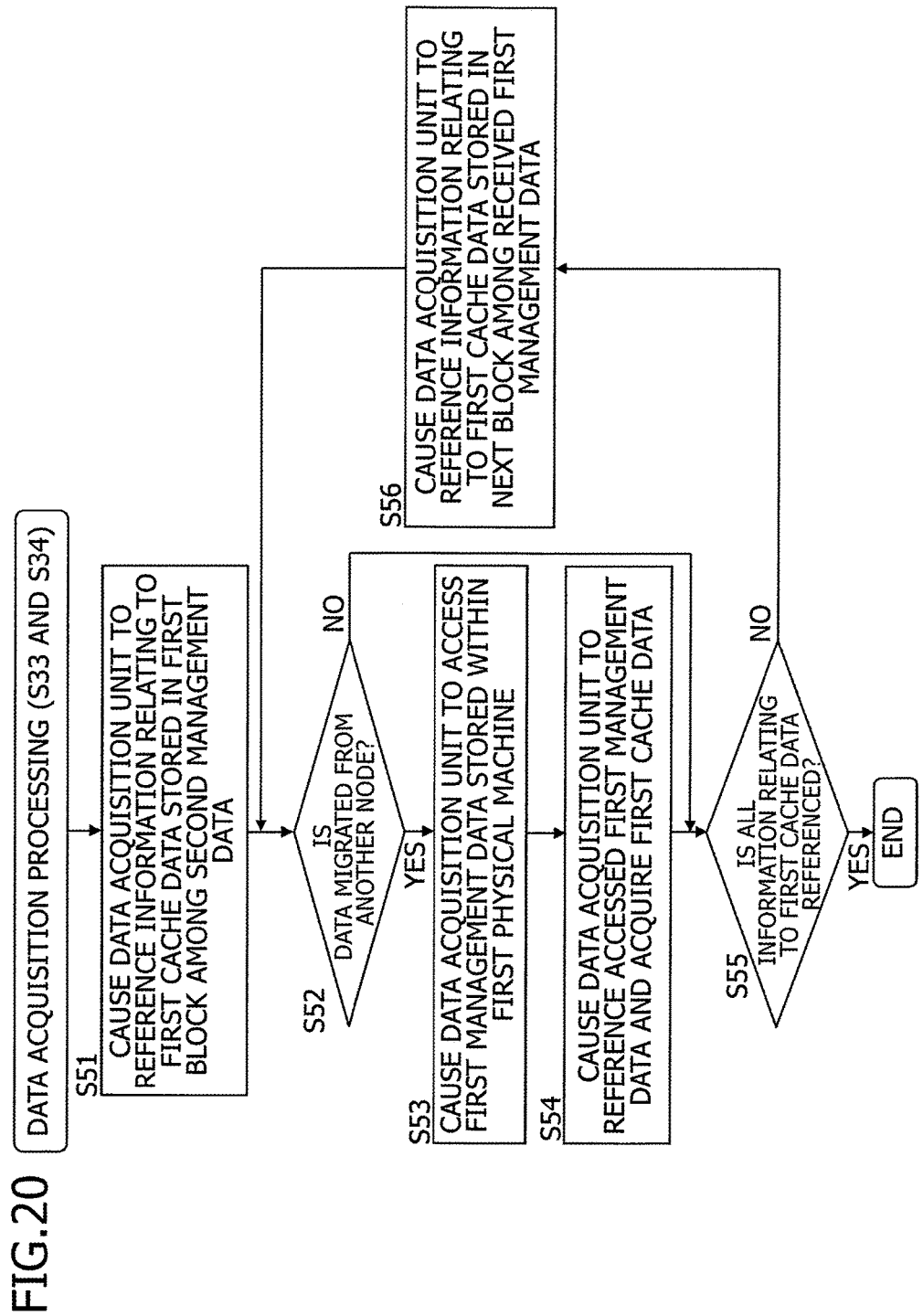
FIG. 20 is a flowchart illustrating data migration processing in the third embodiment.

Next, a third embodiment will be described. FIG. 20 is a flowchart illustrating data migration processing in the third embodiment.

In the third embodiment, unlike in the second embodiment, the data acquisition unit 117B specifies management data relating to cache data migrated along with the execution of job migration among the management data 131B. The data acquisition unit 117B migrates only the cache data to be migrated along with the execution of job migration. Accordingly, in a similar manner to the case in the second embodiment, it is possible for the data acquisition unit 117B to prevent the acquisition from the physical machine 1A regarding data that has been accessed by a migrated job and stored into the cache area 140B. By describing the details of S34 and S35 in FIG. 14 in a similar manner to the second embodiment, the details of the data migration processing in the third embodiment will be described below.

In FIG. 20, in a similar manner to the second embodiment, the data acquisition unit 117B of the physical machine 1B first references information relating to the cache data 141A stored in the first block among the management data 131B (S51), for example. Unlike in the second embodiment, the data acquisition unit 117B determines whether or not the management data 131B corresponding to the determination block is cache data to be migrated to the physical machine 1B along with job migration (S52). Specifically, for example, the data acquisition unit 117B specifies cache data corresponding to the management data 131B in which information is set in the migration flag, the migration source node ID, and the migration destination node ID as the cache data that needs to be migrated. Accordingly, the data acquisition unit 117B can be prevented from acquiring, from the physical machine 1A, cache data that has been stored into the cache area 140B in accordance with an access by a migrated job.

In the case where the cache data is to be migrated along with job migration (YES in S52), the data acquisition unit 117B accesses the management data 131A stored within the physical machine 1A (S53), for example, in a similar manner to the second embodiment. The data acquisition unit 117B references the management data 131A to acquire cache data stored in the determination block among the cache data 141A (S54), for example. In the case where the cache data is not to be migrated to the physical machine 1B along with job migration (NO in S52), the data acquisition unit 117B does not perform the acquisition of the cache data 141A stored in the determination block. Other processing in the third embodiment is the same as the processing in the second embodiment, and therefore description is omitted herein.

That is, in the data migration processing in the third embodiment, the data acquisition unit 117B performs migration only of cache data to be migrated along with the execution of job migration among the cache data 141A. Accordingly, in a similar manner to the second embodiment, the data acquisition unit 117B can be prevented from acquiring, from the physical machine 1A, data that has been accessed by a migrated job and stored into the cache area 140B. Therefore, it is possible to further reduce the processing load of a CPU and the time it takes to migrate cache data.

Fourth Embodiment

Figure 21:
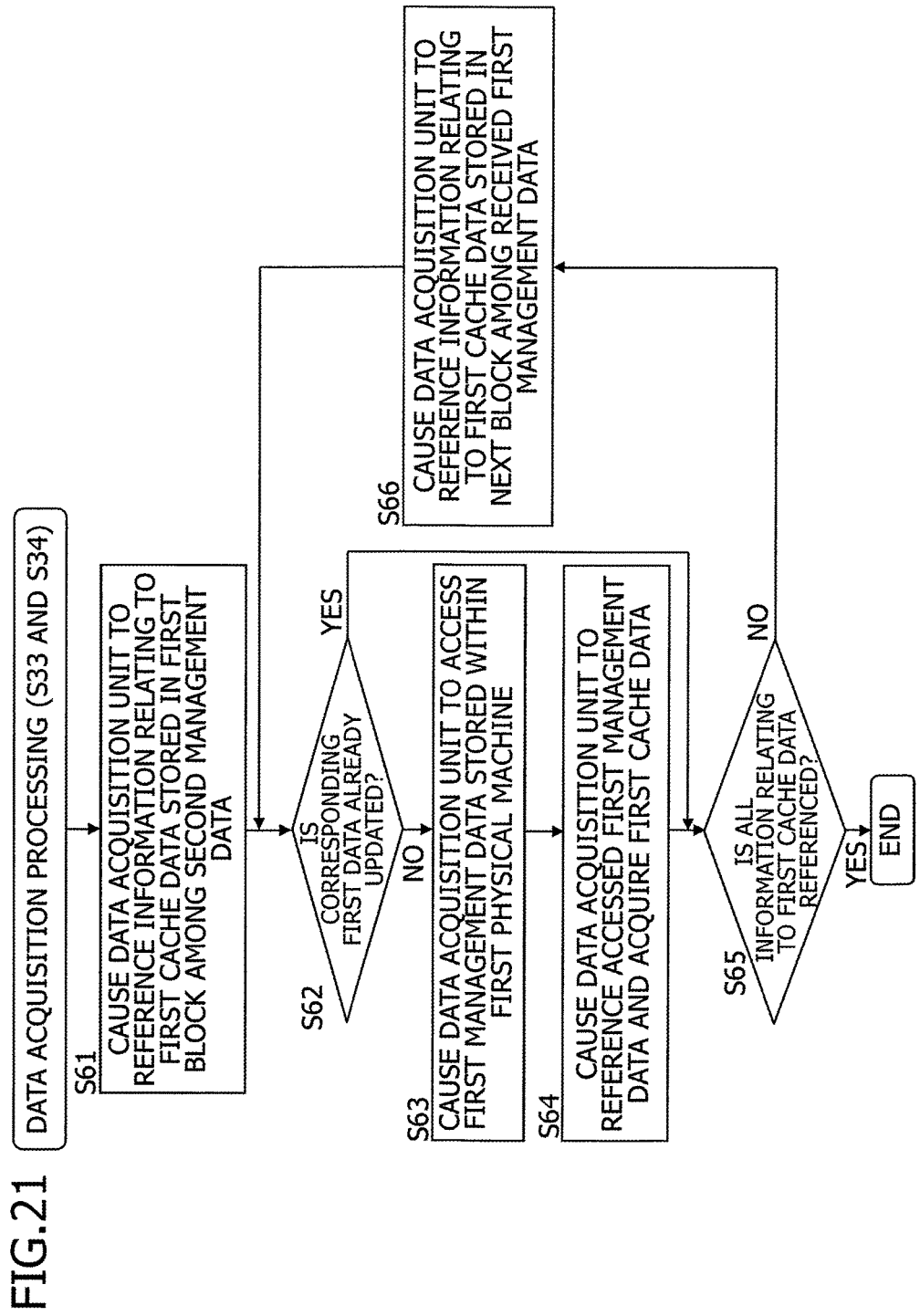
FIG. 21 is a flowchart illustrating data migration processing in the fourth embodiment.

Next, a fourth embodiment will be described. FIG. 21 is a flowchart illustrating data migration processing in the fourth embodiment.

In the fourth embodiment, unlike in the second embodiment, the data acquisition unit 117B references the management data 131B to specify cache data that is not written back to the storage medium 2 among the cache data 141A stored in the cache area 140A. The data acquisition unit 117B migrates only the cache data that is not written back to the storage medium 2. Accordingly, it is possible to migrate only a bare minimum of cache data for ensuring consistency between the cache data 141A and 141B and data stored in the storage medium 2. Therefore, it is possible to reduce the processing load of a CPU and the time it takes to implement job migration. By describing the details of S34 and S35 in FIG. 14 in a similar manner to the second embodiment, the details of the data migration processing in the fourth embodiment will be described.

In FIG. 21, in a similar manner to the second embodiment, the data acquisition unit 117B of the physical machine 1B first references information relating to the cache data 141A stored in the first block among the management data 131B (S61), for example. Unlike in the second embodiment, the data acquisition unit 117B checks whether or not the writeback flag of the management data 131A corresponding to the determination block is "done." Accordingly, it is possible for the data acquisition unit 117B to specify a block storing cache data for which a writeback to the storage medium 2 is not complete among the cache data 141A.

In the case of cache data of which a writeback to the storage medium 2 is not complete (NO in S62), the data acquisition unit 117B accesses the management data 131A stored within the physical machine 1A (S63), for example, in a similar manner to the second embodiment. The data acquisition unit 117B references the management data 131A to acquire cache data stored in the determination block among the cache data 141A (S64), for example. In the case of not cache data of which a writeback to the storage medium 2 is complete (YES in S62), the data acquisition unit 117B does not perform the acquisition of the cache data 141A stored in the determination block. Other processing in the fourth embodiment is the same as the processing in the second embodiment, and therefore description is omitted herein.

That is, in the data migration processing in the fourth embodiment, the data acquisition unit 117B performs migration only of cache data that is not written back to the storage medium 2 among the cache data 141A. Accordingly, it is possible for the data acquisition unit 117B to provide consistency of the content of data accessed by a job, before and after the execution of job migration.

Fifth Embodiment

Figure 22:
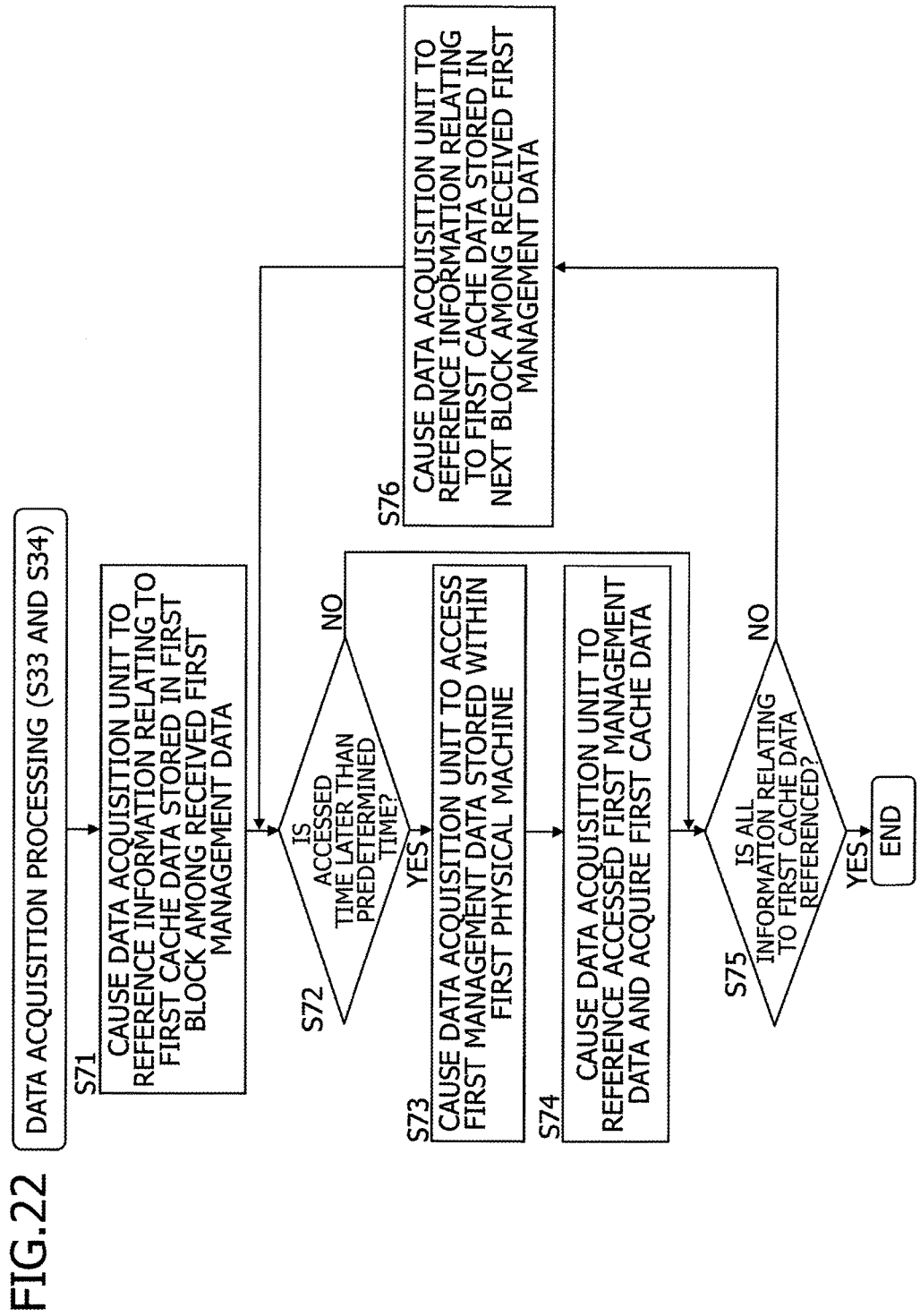
FIG. 22 is a flowchart illustrating data migration processing in the fifth embodiment.

Next, a fifth embodiment will be described. FIG. 22 is a flowchart illustrating data migration processing in the fifth embodiment. FIG. 23 is a diagram illustrating the data migration processing in the fifth embodiment. Referring to FIG. 23, the data migration processing in FIG. 22 will be described.

In the fifth embodiment, the data acquisition unit 117B references the management data 131B to specify cache data of which the last time accessed by a job before performing migration is later than predetermined time among the cache data 141A. Accordingly, the data acquisition unit 117B can perform the acquisition of cache data likely to be accessed by a job of which migration has been performed among the cache data 141A stored in the cache area 140A. Therefore, it is possible to reduce the processing load of a CPU and the time it takes to implement job migration. By describing the details of S34 and S35 in FIG. 14 in a similar manner to the second embodiment, the details of the data migration processing in the fifth embodiment will be described below.

First, a specific example of the management data 131B in the fifth embodiment will be described. FIG. 23 is a specific example of the management data 131B in the fifth embodiment.

The management data 131B illustrated in FIG. 23 includes an item of access time indicating the time at which a job has last accessed the cache data 141A with respect to the management data 131B illustrated in FIG. 19, for example. Specifically, for example, "18:15:12, Jun. 30, 2014" is set as the access time in the management data 131B of which the identification ID is "1." The access time of the management data 131B may be set in the case where the management data creation unit 113A or 113B has detected an access to cache data by a job, for example. Other information in FIG. 23 is the same as the content described above, and therefore description is omitted.

Next, the details of the data migration processing in the fifth embodiment will be described. In FIG. 22, in a similar manner to the second embodiment, the data acquisition unit 117B of the physical machine 1B first references information relating to the cache data 141A stored in the first block among the management data 131B (S71), for example. Unlike in the second embodiment, the data acquisition unit 117B determines whether or not the access time of the management data 131B corresponding to the determination block is later than predetermined time (S72). The predetermined time may be, for example, three hours before the current time. Accordingly, it is possible for the data acquisition unit 117B to specify cache data that has been accessed by a job later than the predetermined time.

In the case where the access time is later than the predetermined time (YES in S72), the data acquisition unit 117B accesses the management data 131A stored within the physical machine 1A (S73), for example, in a similar manner to the second embodiment. The data acquisition unit 117B references the management data 131A to acquire cache data stored in the determination block among the cache data 141A (S74), for example. In the case where the access time is before the predetermined time (NO in S72), the data acquisition unit 117B does not perform the acquisition of the cache data 141A stored in the determination block. Other processing in the fifth embodiment is the same as the processing in the second embodiment, and therefore description is omitted herein.

In the fifth embodiment, it is preferable for the data acquisition unit 117B to perform migration for cache data that is not written back to the storage medium 2 among the cache data 141A, in a similar manner to the case described in the fourth embodiment. Accordingly, it is possible for the data acquisition unit 117B to provide consistency of the content of data accessed by a job, before and after the execution of job migration.

That is, in the data migration processing in the fifth embodiment, the data acquisition unit 117B performs migration only of cache data that has been last accessed by a job later than predetermined time among the cache data 141A. Accordingly, it is possible for the data acquisition unit 117B to migrate only cache data likely to be accessed by a migrated job. Therefore, it is possible to further reduce the processing load of the CPU and the time it takes to migrate cache data. Moreover, it is possible to prevent a decrease in the efficiency of data access by a migrated job.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data migration method comprising:
storing, by a first control processor that operates in a first physical machine and that controls a first cache memory in the first physical machine storing first cache data cached from first storage data stored in a storage, first management information in a first storage including information indicating a storage location of the first cache data on the first cache memory, state information indicating whether the first storage data has been updated in accordance with an update of the first cache data for each block of a predetermined data size in the first cache memory, identification information of the first cache data corresponding to each block in the first cache memory and information indicating whether the first cache data is stored for each block in the first cache memory,
when a program that accesses the first cache data migrates to a different node, setting, by the first control processor, information indicating that cache data is not stored in all blocks in the first management information and transmitting, by the first control processor, the first management information stored in the first storage to a second control processor that operates in a second physical machine and that controls a second cache memory in the second physical machine capable of being accessed by the program after migration to the different node,
when new cache data to be stored in a block corresponding to information indicating that cache data is not stored among the first management information transmitted from the first control processor is acquired from the first storage data and stored in the second cache memory, setting, by the second control processor, information indicating that the acquired new cache data is stored in the first management information transmitted from the first control processor,
acquiring, by the second control processor, the first cache data stored in a block indicating that cache data is not stored in the first cache memory based on information indicating whether or not cache data corresponding to each block is stored among the first management information transmitted from the first control processor, setting, by the second control processor, information indicating that cache data is stored in a block corresponding to the acquired first cache data to the first management information transmitted from the first control processor and storing, by the second control processor, the acquired first cache data in the second cache memory, and
specifying, by the second control processor, cache data corresponding to the block corresponding to the first storage data that is not updated among the stored first cache data based on the first management information transmitted from the first control processor, and first updating, by the second control processor, the first storage data based on the specified cache data.

2. The data migration method according to claim 1, further comprising:
creating, by the second control processor, second management information including information indicating a storage location of second cache data on the second cache memory and state information indicating whether the first storage data has been updated in accordance with an update of the second cache data for each block of a predetermined data size in the second cache memory before the transmitting, and
after the transmitting, setting, by the second control processor, in the received first management information, the storage location on the second cache memory in which the first cache data is to be stored, and updating, by the second control processor, the second management information to include the set first management information, wherein
the first acquiring includes acquiring the first cache data based on the updated second management information, and
the first storing includes storing the acquired first cache data at least as a part within the second cache data.

3. The data migration method according to claim 2, wherein the first acquiring includes acquiring the first cache data corresponding to the block, for which states information indicating that the first storage data is not updated is set in the second management information, among cache data stored in the second cache memory.

4. The data migration method according to claim 2, wherein
the first management information includes information indicating whether cache data is migrated from a different node for each the block in the first cache memory,
the second management information includes information indicating whether cache data is migrated from a different node for each the block in the second cache memory, and
the first acquiring includes acquiring the first cache data corresponding to the block, for which information indicating that cache data has been migrated from a different node has been set in the second management information, among cache data stored in the second cache memory.

5. The data migration method according to claim 2, wherein the first management information includes time information indicating time at which the first cache data has been last accessed by the program before migration to the different node for each the block in the first cache memory,
the second management information includes time information indicating time at which the first cache data has been last accessed by the program before migration to the different node for each the block in the second cache memory, and
the first acquiring includes acquiring the first cache data corresponding to the block, for which time later than predetermined time has been set in the second management information as the time information, among cache data stored in the second cache memory.

6. A data migration device comprising:
a cache memory in a physical machine that stores cache data cached from first storage data stored in a storage; and
a control processor that operates in the physical machine, controls the cache memory, and stores first management information in a first storage including information indicating a storage location of the cache data on the cache memory, information indicating whether the first storage data has been updated in accordance with an update of the cache data for each block of a predetermined data size in the cache memory, identification information of the cache data corresponding to each block in the cache memory and information indicating whether the cache data is stored for each block in the cache memory, and
when a program that accesses the cache data migrates to a different node, sets information indicating that cache data is not stored in all blocks in the first management information and transmits the first management information stored in the first storage to a different control processor that operates in a different physical machine and that controls different cache memory in the different physical machine capable of being accessed by the program after migration to the different node.

7. A data migration device comprising:
a cache memory in a physical machine that stores cache data cached from first storage data stored in a storage; and
a control processor that operates in the physical machine, receives, from a different control processor that operates in a different physical machine, first management information stored in a storage including information indicating a storage location of different cache data on a different cache memory, information indicating whether the first storage data has been updated in accordance with an update of the cache data corresponding to a block for each block of a predetermined data size in the different cache memory and information indicating whether the different cache data is stored for each block in the different cache memory,
when new cache data to be stored in a block corresponding to information indicating that cache data is not stored among the first management information transmitted from the different control processor is acquired from the first storage data and stored in the cache memory, sets information indicating that the acquired new cache data is stored in the first management information transmitted from the different control processor, and
acquires the different cache data stored in a block indicating that cache data is not stored in the different cache memory based on information indicating whether or not cache data corresponding to each block is stored among the first management information transmitted from the different control processor, sets information indicating that cache data is stored in a block corresponding to the acquired different cache data to the first management information transmitted from the different control processor, stores the acquired different cache data in the cache memory, specifies cache data corresponding to the block corresponding to the first storage data is not updated among the stored cache data, and updates the first storage data based on the specified cache data.

* * * * *